United States Patent
Williams

(10) Patent No.: US 7,815,226 B2
(45) Date of Patent: *Oct. 19, 2010

(54) FITTING FOR METAL PIPE AND TUBING

(75) Inventor: Peter C. Williams, Cleveland Heights, OH (US)

(73) Assignee: Swagelok Company, Solon, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/197,338

(22) Filed: Aug. 25, 2008

(65) Prior Publication Data

US 2009/0033093 A1 Feb. 5, 2009

Related U.S. Application Data

(63) Continuation of application No. 10/642,430, filed on Aug. 15, 2003, now Pat. No. 7,416,225, which is a continuation-in-part of application No. 10/467,241, filed as application No. PCT/US02/03430 on Feb. 6, 2002, now Pat. No. 7,393,018.

(60) Provisional application No. 60/266,735, filed on Feb. 6, 2001.

(51) Int. Cl.
*F16L 19/08* (2006.01)
*F16L 13/14* (2006.01)

(52) U.S. Cl. ............... 285/341; 285/342; 285/343; 285/382.7

(58) Field of Classification Search ............... 285/341, 285/342, 343, 382.7
See application file for complete search history.

(56) References Cited

U.S. PATENT DOCUMENTS

| 771,682 | A | 10/1904 | Sussman |
| 791,905 | A | 6/1905 | Higginbotham |
| 1,058,542 | A | 4/1913 | Brown |
| 1,334,130 | A | 3/1920 | Blanchard |
| 1,755,210 | A | 5/1930 | Dobner |
| 1,889,778 | A | 12/1932 | Dobrick |

(Continued)

FOREIGN PATENT DOCUMENTS

DE 4041679 6/1992

(Continued)

OTHER PUBLICATIONS

Parker Hannifin Corporation, Suparcase, The Invisible Breakthrough, Parker Suparcase Promotion Folder, Parker Hannifin Corporation, Huntsville, AL.

(Continued)

*Primary Examiner*—James M Hewitt
(74) *Attorney, Agent, or Firm*—Calfee, Halter & Griswold LLP

(57) ABSTRACT

A tube fitting that uses only two components, namely a fitting body and a fitting nut. The nut and body are adapted to be threadably coupled together by relative rotation therebetween. The nut includes an integral tube gripping ring that cooperates with a camming surface on the body when the fitting is made-up. The camming surface preferably has a steep camming angle. The ring is radially compressed against the tube outer wall to form a seal and a tight tube grip. The ring also forms a line contact-type seal against the camming surface. The ring is designed to have a hinging action and to plastically deform during pull-up to embed into the tubing for excellent tube grip, and an axially adjacent swage or collet zone that isolates any stress riser resulting from the embedding action from vibration effects. The fitting components, and particularly the ring, may be case hardened. The fitting may include a self-gauging feature to indicate sufficient pull-up and to prevent excessive pull-up. Also provided is a single ferrule tube fitting that uses a steep camming surface and has a hardness ratio that is at least about 3.3 times the hardness of the stainless steel tube end on the Vickers scale.

6 Claims, 8 Drawing Sheets

U.S. PATENT DOCUMENTS

| | | |
|---|---|---|
| 1,927,464 A | 9/1933 | McIntosh |
| 1,983,840 A | 12/1934 | Dohner |
| 2,083,091 A | 6/1937 | Rector |
| 2,127,611 A | 8/1938 | Mueller |
| 2,139,413 A | 12/1938 | Kreidel |
| 2,150,042 A | 3/1939 | Shultz |
| 2,152,537 A | 3/1939 | Couty |
| 2,165,626 A | 7/1939 | Ford |
| 2,179,127 A | 11/1939 | Lauer |
| 2,284,216 A | 5/1942 | Kunkel |
| 2,333,470 A | 11/1943 | Cowles |
| 2,405,822 A | 8/1946 | Franck |
| 2,406,488 A | 8/1946 | Brock |
| 2,450,170 A | 9/1948 | Smith |
| 2,542,276 A | 10/1948 | Woodling |
| 2,460,621 A | 2/1949 | Courtot |
| 2,460,635 A | 2/1949 | Herold |
| 2,474,178 A | 6/1949 | Wurzburger |
| 2,497,274 A | 2/1950 | Richardson |
| 2,508,763 A | 5/1950 | Mercier |
| 2,511,134 A | 6/1950 | Stranberg |
| 2,544,108 A | 3/1951 | Richardson |
| 2,544,109 A | 3/1951 | Richardson |
| 2,553,981 A | 5/1951 | Richardson |
| 2,561,648 A | 7/1951 | Bradley |
| 2,579,529 A | 12/1951 | Woodling |
| 2,641,489 A | 6/1953 | Hedberg |
| 2,693,374 A | 11/1954 | Wurzburger |
| 2,738,994 A | 3/1956 | Kreidel et al. |
| 2,755,110 A | 7/1956 | Jacobs |
| 2,768,845 A | 10/1956 | Samiran |
| 2,823,935 A | 2/1958 | Wurzburger |
| 3,006,558 A | 11/1961 | Schmohl et al. |
| 3,007,721 A | 11/1961 | Schmohl et al. |
| 3,025,084 A | 3/1962 | Franck |
| 3,120,969 A | 2/1964 | Schmohl |
| 3,139,293 A | 6/1964 | Franck |
| 3,167,333 A | 1/1965 | Hall et al. |
| 3,195,933 A | 7/1965 | Jacobs |
| 3,215,457 A | 11/1965 | Teeters |
| 3,248,136 A | 4/1966 | Brozek et al. |
| 3,275,350 A | 9/1966 | Kody et al. |
| 3,290,062 A | 12/1966 | Ziherl et al. |
| 3,319,293 A | 5/1967 | Gollos |
| 3,325,192 A | 6/1967 | Sullivan |
| 3,326,582 A | 6/1967 | Currie |
| 3,379,461 A | 4/1968 | Davis |
| 3,445,128 A | 5/1969 | Teeters |
| 3,454,290 A | 7/1969 | Tairraz |
| 3,512,812 A | 5/1970 | Kreidel et al. |
| 3,565,467 A | 2/1971 | Haldopoulos et al. |
| 3,580,617 A | 5/1971 | Ehrenberg et al. |
| 3,684,322 A | 8/1972 | Kotsakis |
| 3,695,647 A | 10/1972 | Pugliese |
| 3,708,186 A | 1/1973 | Takagi et al. |
| 3,736,008 A | 5/1973 | Crawford |
| 3,743,324 A | 7/1973 | Schwarz et al. |
| 3,857,591 A | 12/1974 | Voss |
| 3,888,521 A | 6/1975 | O'Sickey |
| 3,893,716 A | 7/1975 | Moreiras et al. |
| 3,895,832 A | 7/1975 | Ellis et al. |
| 3,923,323 A | 12/1975 | Brogan |
| 3,970,337 A | 7/1976 | Niemeyer |
| 3,977,708 A | 8/1976 | Jopp |
| 3,992,043 A | 11/1976 | Whitley |
| 4,022,497 A | 5/1977 | Kotsakis |
| 4,026,581 A | 5/1977 | Pasbrig |
| 4,033,614 A | 7/1977 | Hanson |
| 4,037,864 A | 7/1977 | Anderson et al. |
| 4,072,328 A | 2/1978 | Elliott |
| 4,076,286 A | 2/1978 | Spontelli |
| 4,133,312 A | 1/1979 | Burd |
| 4,133,565 A | 1/1979 | Shutt |
| 4,136,896 A | 1/1979 | Rodman et al. |
| 4,136,897 A | 1/1979 | Haluch |
| 4,169,967 A | 10/1979 | Bachle |
| 4,192,532 A | 3/1980 | Pacella |
| 4,256,334 A | 3/1981 | Boisset et al. |
| 4,293,149 A | 10/1981 | Bonel |
| 4,304,422 A | 12/1981 | Schwarz |
| 4,309,050 A | 1/1982 | Legris |
| 4,343,456 A | 8/1982 | Zitzloff |
| 4,458,927 A | 7/1984 | Smith |
| 4,483,555 A | 11/1984 | Ludwig |
| 4,500,117 A | 2/1985 | Ayers et al. |
| 4,508,374 A | 4/1985 | Kantor |
| 4,523,256 A | 6/1985 | Small |
| 4,529,231 A | 7/1985 | Greenawalt |
| 4,538,836 A | 9/1985 | Krutten |
| 4,538,842 A | 9/1985 | Kowal et al. |
| 4,541,537 A | 9/1985 | Sailor |
| 4,556,242 A | 12/1985 | Kowal et al. |
| 4,586,731 A | 5/1986 | Castrup |
| 4,630,851 A | 12/1986 | Ogawa |
| 4,647,086 A | 3/1987 | Maxwell et al. |
| 4,655,485 A | 4/1987 | Albrecht et al. |
| 4,682,797 A | 7/1987 | Hildner |
| 4,739,828 A | 4/1988 | Bayer et al. |
| 4,789,759 A | 12/1988 | Jones |
| 4,890,867 A | 1/1990 | Briggs et al. |
| 4,903,942 A | 2/1990 | Licciardello et al. |
| 4,940,263 A | 7/1990 | Mayernik |
| 4,944,534 A | 7/1990 | Kotyk |
| 5,074,155 A | 12/1991 | Vecere |
| 5,074,599 A | 12/1991 | Wirbel et al. |
| 5,114,190 A | 5/1992 | Chalmers |
| 5,134,676 A | 7/1992 | Boillot et al. |
| 5,163,722 A | 11/1992 | Worden |
| 5,193,616 A | 3/1993 | Hynes |
| 5,217,261 A | 6/1993 | DeWitt et al. |
| 5,240,289 A | 8/1993 | Gottling et al. |
| 5,335,946 A | 8/1994 | Dent et al. |
| 5,351,998 A | 10/1994 | Behrens et al. |
| 5,439,259 A | 8/1995 | Taga et al. |
| 5,489,127 A | 2/1996 | Anglin et al. |
| 5,607,194 A | 3/1997 | Ridenour |
| 5,658,025 A | 8/1997 | Ridenour |
| 5,711,549 A | 1/1998 | Beans |
| 5,716,082 A | 2/1998 | Vogel et al. |
| 5,718,459 A | 2/1998 | Davie et al. |
| 5,725,259 A | 3/1998 | Dials |
| 5,823,256 A | 10/1998 | Moore |
| 5,954,375 A | 9/1999 | Trickle et al. |
| 5,961,160 A | 10/1999 | Frohlich |
| 6,007,112 A | 12/1999 | Kim |
| 6,022,053 A | 2/2000 | Hukuda |
| 6,039,361 A | 3/2000 | Meli |
| 6,045,164 A | 4/2000 | Nishio |
| 6,073,976 A | 6/2000 | Schmidt et al. |
| 6,089,620 A | 7/2000 | Mota Lopez et al. |
| 6,102,449 A | 8/2000 | Welsh |
| 6,109,660 A | 8/2000 | Akiyama et al. |
| 6,123,364 A | 9/2000 | Inoue et al. |
| 6,131,963 A | 10/2000 | Kuhns et al. |
| 6,168,211 B1 | 1/2001 | Schorn-Gilson |
| 6,173,995 B1 | 1/2001 | Mau |
| 6,179,348 B1 | 1/2001 | Okamoto |
| 6,279,242 B1 | 8/2001 | Williams et al. |
| 6,361,083 B1 | 3/2002 | Riesselmann et al. |

| | | | |
|---|---|---|---|
| 7,393,018 B2 | 7/2008 | Williams | |
| 7,416,225 B2 | 8/2008 | Williams | |

FOREIGN PATENT DOCUMENTS

| | | |
|---|---|---|
| EP | 34493 | 8/1981 |
| EP | 118656 | 6/1986 |
| EP | 205170 | 12/1986 |
| EP | 224188 | 6/1987 |
| EP | 309179 | 3/1989 |
| EP | 371063 | 2/1992 |
| EP | 484091 | 5/1992 |
| EP | 285677 | 12/1992 |
| EP | 396367 | 1/1993 |
| EP | 531068 | 3/1993 |
| EP | 581408 | 2/1994 |
| EP | 528079 | 3/1994 |
| EP | 489289 | 5/1994 |
| EP | 523020 | 2/1996 |
| EP | 638752 | 2/1996 |
| EP | 583707 | 3/1996 |
| EP | 441676 | 6/1996 |
| EP | 751334 | 1/1997 |
| EP | 762003 | 3/1997 |
| EP | 863354 | 9/1998 |
| EP | 879980 | 11/1998 |
| EP | 895014 | 2/1999 |
| EP | 940617 | 9/1999 |
| EP | 1020675 | 7/2000 |
| EP | 1033518 | 9/2000 |
| EP | 1055859 | 11/2000 |
| FR | 818587 | 3/1937 |
| FR | 1263685 | 6/1961 |
| FR | 2335783 | 7/1977 |
| GB | 1057900 | 2/1967 |
| GB | 2032555 | 5/1980 |
| GB | 2080900 | 2/1982 |
| GB | 2258897 | 2/1993 |
| GB | 2259123 | 7/1995 |
| JP | 4429659 | 12/1969 |
| JP | 461462 | 1/1971 |
| JP | 4874317 | 9/1973 |
| JP | 50149910 | 12/1975 |
| JP | 513917 | 1/1976 |
| JP | 51017219 | 2/1976 |
| JP | 55181082 | 12/1980 |
| JP | 551559392 | 12/1980 |
| JP | 5621679 | 2/1981 |
| JP | 5666586 | 6/1981 |
| JP | 56124787 | 9/1981 |
| JP | 57202084 | 12/1982 |
| JP | 59006488 | 1/1984 |
| JP | 60139988 | 7/1984 |
| JP | 6112886 | 5/1986 |
| JP | 61099790 | 5/1986 |
| JP | 61105391 | 5/1986 |
| JP | 5712887 | 1/1987 |
| JP | 63231086 | 9/1988 |
| JP | 1054599 | 11/1989 |
| JP | 369026 | 10/1991 |
| JP | 3288091 | 12/1991 |
| JP | 4023157 | 4/1992 |
| JP | 4069488 | 3/1994 |
| JP | 6174171 | 6/1994 |
| JP | 7243564 | 9/1995 |
| JP | 08-014449 | 1/1996 |
| JP | 11201347 | 7/1999 |
| JP | 11325342 | 11/1999 |
| JP | 2000097377 | 4/2000 |
| JP | 2001110975 | 4/2000 |
| JP | 3069026 | 5/2000 |
| JP | 2000170966 | 6/2000 |
| JP | 200199360 | 4/2001 |
| JP | 2001099337 | 4/2001 |
| JP | 2001141169 | 5/2001 |
| WO | 84/00796 | 3/1984 |
| WO | 88/04385 | 6/1988 |
| WO | 89/09904 | 10/1989 |
| WO | 89/12190 | 12/1989 |
| WO | 93/24780 | 12/1993 |
| WO | 93/25837 | 12/1993 |
| WO | 94/23234 | 10/1994 |
| WO | 97/07356 | 2/1997 |
| WO | 97/14905 | 4/1997 |
| WO | 97/43571 | 11/1997 |
| WO | 98/32999 | 7/1998 |
| WO | 98/46925 | 10/1998 |
| WO | 99/24750 | 5/1999 |
| WO | 99/34142 | 7/1999 |
| WO | 01/20214 | 3/2001 |
| WO | 01/73333 | 10/2001 |
| WO | 02/063194 | 8/2002 |
| WO | 02/063195 | 8/2002 |

OTHER PUBLICATIONS

Parker Hannifin Corporation, Parker Suparcase Process Hardens Stainless Steel to Become More Resistant to Corrosion, News Release, Parker Hannifin Corporation, Huntsville, AL.
Parker Hannifin Corporation, Engineering Report—Ferrule Design Suparcase, Parker Suparcase Bulletin, 4230-B15.1, Parker Hannifin Corporation, Huntsville, AL.
Parker Hannifin Corporation, Parker Suparcase, A Proprietary Process for the Hardening of Stainless Steel Ferrules, Parker Suparcase Bulletin, Mar. 1993, 4230-B15.3, Parker Hannifin Corporation, Huntsville, AL.
International Search Report for PCDT/US2004/026096, mailed Dec. 29, 2004.
Examination Report issued Aug. 22, 2005 from corresponding European Patent Application Serial No. 02703345.5, 2 pgs.
Examination Report issued Aug. 4, 2006 from corresponding European Patent Application Serial No. 02703345.5, 4 pgs.
International Search Report from PCT/US02/03430, mailed Nov. 6, 2002.
Office action from Japanese Patent Application Serial No. 2002-562904, dispatched Aug. 7, 2007.

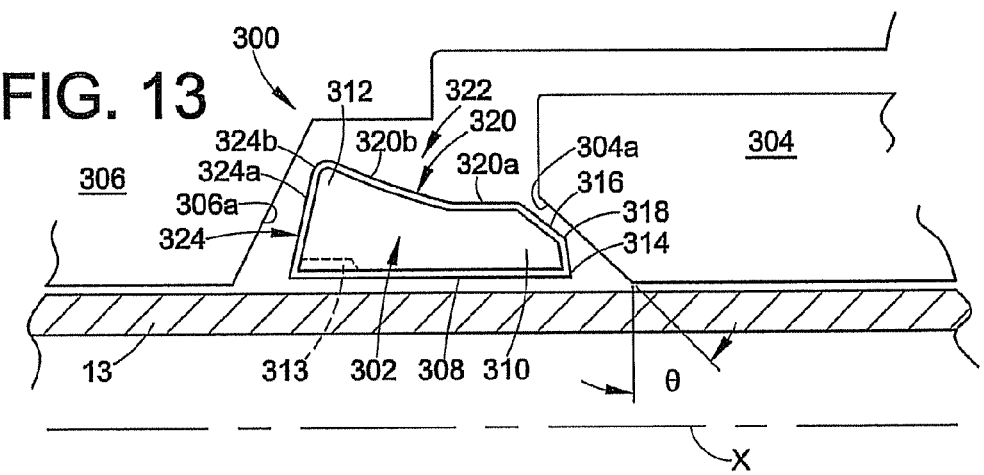
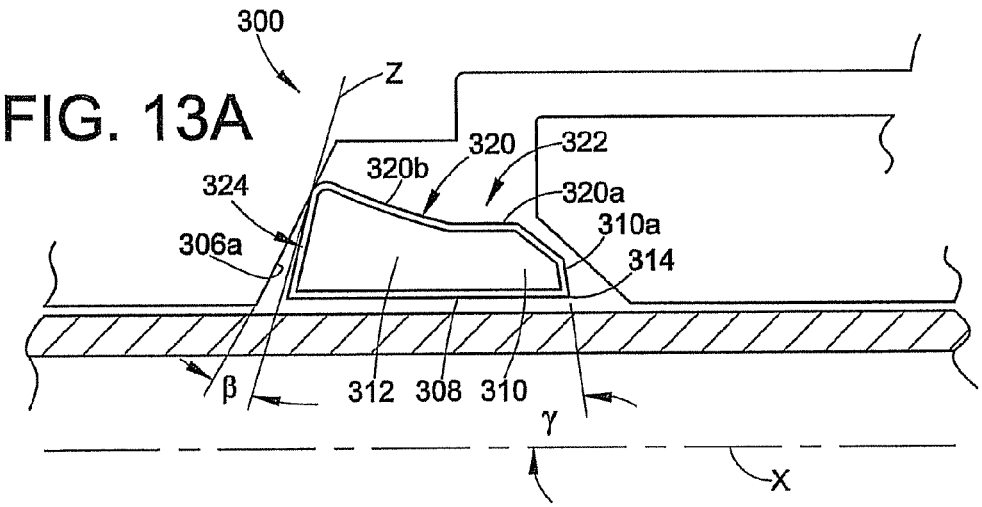
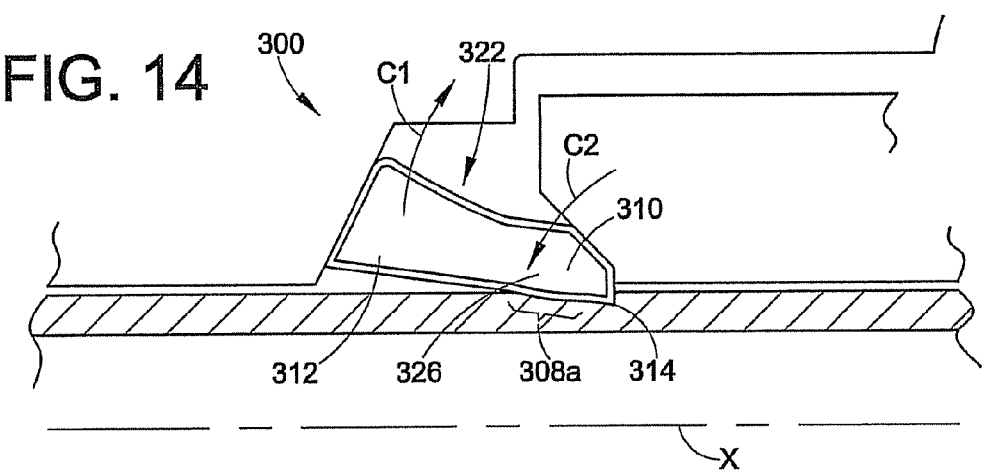

FITTING FOR METAL PIPE AND TUBING

RELATED APPLICATIONS

This application is a continuation of U.S. application Ser. No. 10/642,430, filed on Aug. 15, 2003 for FITTING FOR METAL PIPE AND TUBING, now U.S. Pat. No. 7,416,225, which is a continuation-in-part of U.S. patent application Ser. No. 10/467,241, filed on Aug. 6, 2003 for TUBE FITTING FOR STAINLESS STEEL TUBING, now U.S. Pat. No. 7,393,018, which is a national phase entry under 35 U.S.C. .sctn.371 and claims priority to International patent application no. PCT/US02/03430 filed on Feb. 6, 2002 for TUBE FITTING FOR STAINLESS STEEL TUBING, which claims the benefit of U.S. Provisional patent application Ser. No. 60/266,735 filed on Feb. 6, 2001 for TUBE FITTING WITH INTEGRAL NUT AND FERRULE, the entire disclosures of which are all fully incorporated herein by reference.

TECHNICAL FIELD OF THE INVENTION

The subject invention is generally directed to the art of fittings for stainless steel pipe and tube. More particularly, the invention is directed to flareless fittings that include a steep angle camming surface and/or geometry and properties of the material of the tube gripping device, such as a ferrule or tube gripping ring.

BACKGROUND OF THE INVENTION

Tube fittings are used to join or connect a tube end to another member, whether that other member be another tube end such as through T-fittings and elbow fittings, for example, or a device that needs to be in fluid communication with the tube end, such as for example, a valve. As used herein the terms "tube" and "tubing" are intended to include but not be limited to pipe as well. Any tube fitting must accomplish two important functions within the pressure, temperature and vibration criteria that the tube fitting is designed to meet. First, the tube fitting must grip the tube end so as to prevent loss of seal or tube blow out. Secondly, the tube fitting must maintain a primary seal against leakage. The requirement that a tube fitting accomplish these two functions has been the driving factor in tube fitting design for decades. A multitude of factors influence the design of a tube fitting to meet a desired grip and seal performance criteria, but basic to any tube fitting design will be: 1) the characteristics of the tubing that the fitting must work with, including the material, outside diameter and wall thickness; and 2) the tube grip and seal performance level required of the tube fitting for its intended applications. The goal is to design a tube fitting that reliably achieves the desired tube grip and seal functions within whatever cost constraints are imposed on the product by competing designs in the marketplace.

A flareless tube fitting generally refers to a type of tube fitting in which the tube end remains substantially tubular, in contrast to a flared tube fitting in which the tube end is outwardly flared over a fitting component. Flared tube ends are commonly encountered in use with plastic tubing and plastic tube fittings. The present invention is not directed to plastic tubing or tube fittings because such fittings have significantly different challenges and material properties that affect the ability of the fitting to both grip the tube and provide an adequate seal. Operating pressures and temperatures are also typically substantially lower in the plastics art. In other words, with respect to tube grip and seal, whatever works in a plastic tube fitting provides little or no guidance for a nonplastic tube fitting.

Tube fittings that are intended for use with stainless steel tubing, for example, are particularly challenging to design in order to achieve the desired tube grip and seal functions. This arises from the nature of stainless steel which, in terms of typical commercially available tubing material, is a very hard material, usually on the order of up to 200 Vickers. Stainless steel tubing is also used for high pressure applications in which the tubing wall thickness is substantial (referred to in the art as "heavy walled" tubing). Heavy wall tubing is difficult to grip because it is not only hard but it is also not particularly ductile. Low ductility makes it more difficult to deform the tubing plastically so as to achieve a desired tube grip.

Tube fittings for stainless steel tubing typically include an assembly of: 1) a tube gripping device, often in the form of a ferrule or ferrules, or a gripping ring-like structure, and 2) a pull-up mechanism for causing the tube gripping device to be installed on a tube end so as to grip the tube end and provide a seal against leakage. The term "pull-up" simply refers to the operation of tightening the tube fitting assembly so as to complete the assembly of the fitting onto the tube end with the desired tube grip and seal.

Usually a stainless steel tube fitting is first assembled in a "finger tight" condition and then a wrench or other suitable tool is used to tighten or "pull up" the fitting to its final initial and complete assembled condition. In some cases, especially for larger tube sizes, a swaging tool is used to pre-install a ferrule onto the tubing. The pull up mechanism most commonly used is a threaded connection of a female threaded nut component and a male threaded body component, with the tube gripping device being acted upon by these two components as they are threaded and tightened together. The body includes a tube end receiving bore with an angled camming surface at the outer portion of that bore. The most commonly used camming surfaces are frusto-conical such that the term "camming angle" refers to the cone angle of the camming surface relative to the tube end longitudinal axis or outer surface. The gripping device is slipped onto the tube end and the tube end is axially inserted into the body bore and extends past the frusto-conical camming surface. The nut is partially threaded onto the body to the finger tight position such that the tube gripping device is captured axially between the canning surface and the nut. The nut typically includes an inward shoulder that drives the tube gripping device into engagement with the angled camming surface on the body as the nut and body components are threadably tightened together. The angled camming surface imparts a radial compression to the tube gripping device, forcing the tube gripping device into a gripping engagement with the tube end. The tube gripping device typically is to form a seal against the outer surface of the tubing and also against the angled camming surface.

The most commonly used tube gripping devices in stainless steel tube fittings today (the most commonly used are ferrule-type tube fittings) achieve tube grip by causing a front or nose portion of the tube gripping device to bite into the tube end outer surface. As used herein, the term "bite" refers to the plastic deformation of the tube gripping device into the outer surface of the tube end so as to plastically deform and indent the tubing with an almost cutting-like action to create a generally radial shoulder or wall at the front end of the tube gripping device. This "bite" thus serves as a strong structural feature to prevent tube blow out at high pressure, particularly for larger diameter tubing such as ½" and higher.

Over the years there have been numerous tube fitting designs that do not rely on a "bite" type action, but rather merely radially compress the tube gripping device against the tubing outer surface, some with the effect of indenting into the tubing without creating a bite. These designs are not suitable for high pressure stainless steel tube fittings. The most common commercially available stainless steel tube fittings especially for high pressure applications have historically been of two radically distinct designs of the tube gripping device—single ferrule tube fittings and two ferrule tube fittings.

A single ferrule tube fitting, as the name implies, uses a single ferrule to accomplish both the tube grip and seal functions. However, it is becoming increasingly recognized that these two functions are at odds with each other when designing a tube fitting that can meet a desired tube grip and seal performance criteria. This is because the design criteria needed to assure that the tube fitting achieves an adequate tube grip usually works against the ability of the single ferrule to also provide an effective seal. Consequently, although prior art single ferrule fittings can achieve adequate tube grip in some cases, this tube grip performance comes at the expense of having a less effective seal. One result of this situation is that some single ferrule tube fittings have been designed with additional components and techniques to achieve an adequate seal. Less than optimum seal performance is particularly noted in single ferrule fittings that attempt to seal against gas, and especially high pressure gas. Single ferrule tube fittings thus are usually more suited to lower pressure liquid applications such as hydraulics, however, even in such lower pressure applications single ferrule seal performance remains less than desired.

For single ferrule tube fittings, the biting action is usually associated with the single ferrule being designed to bow in a radially outward direction from the tube wall in the central region or mid-portion of the single ferrule body between the front and back ends thereof. The front end of the ferrule is driven against the angled camming surface of the body by the nut pushing against the back end of the ferrule. The bowing action helps direct the front end of the single ferrule into the tube end. The bowing action is also used to cause the back end of the ferrule to likewise engage and grip the tube end. This is accomplished usually by provided an angled drive surface on the nut shoulder that engages the back end of the single ferrule so as to radially compress the back end of the ferrule into a gripping action on the tube end. In some single ferrule designs, the back end of the ferrule apparently is intended to bite into the tube end. This back end tube grip is sometimes used with the single ferrule in order to attempt to improve the tube fitting's performance under vibration because the back end grip attempts to isolate vibration coming from outside the fitting such as, for example, in a fitting installation that includes a pump, from affecting the front end tube bite.

The use of a back end tube grip actually works against the effort to grip the tube end at the front end of the single ferrule. Ideally, to more effectively withstand the load of gripped tube under pressure, against the ferrule front end, the single ferrule should be substantially in three dimensional compression (axial, radial and hoop) between the nut and the camming surface of the body. Providing a back end grip actually places a counter acting tension or lessened axial compression to the single ferrule that works against the front end compression being used to provide the tube grip. Additionally, the outward bowing action tends to work against the effort to grip the tube at the front end of the single ferrule because, in order to enable the outward bowing action, the single ferrule requires a lessened mass that is adjacent the tube gripping "bite". The outward bowing action radially displaces ferrule mass central to the ferrule body away from the tube end. Consequently, an outwardly bowed single ferrule fitting could be more susceptible to ferrule collapse, loss of seal and possibly tube blow out at higher pressures.

In order to achieve an adequate tube grip on stainless steel tubing, single ferrule stainless steel tube fittings have historically used a rather shallow camming angle of between ten and twenty degrees. This range of angles is referred to herein as "shallow" only as a term of convenience in that the angle is rather small. The shallow camming angle has been used in single ferrule fittings to obtain a mechanical advantage because the shallow angle provides an axially elongated camming surface against which to slide and radially compress the single ferrule front end to bite into the tube end outer surface. Hard stainless steel tubing material necessitated this elongated sliding camming action in order to be able to get the single ferrule to create an adequate bite for tube grip. Over the years, the single ferrule has been through hardened or case hardened so as to be significantly harder than the stainless steel tubing, however, the shallow camming angle is still used today in such single ferrule fittings to obtain a mechanical advantage from the ferrule sliding along the camming surface to produce the "bite" so as to assure an adequate tube grip. An example of a commercially available single ferrule tube fitting that uses a case hardened ferrule and a shallow camming angle of about twenty degrees is the CPI fitting line available from Parker-Hannifin Corporation. Another example is the EO fitting line available from Ermeto GmbH that uses a through hardened single ferrule and a twelve degree camming angle.

In some single ferrule designs, a non-conical camming surface has been tried whereby an attempt is made to simply press the ferrule against the outer surface of the tube end, thereby not creating a bite. The result in such cases however is a low grip or low pressure only fitting that are not well suited to stainless steel fittings.

The shallow camming angle and elongated camming surface and axial movement needed to achieve an adequate tube grip with a single ferrule fitting, however, compromises the ability of the single ferrule to achieve the seal function, especially in extreme environments and for sealing gas. This is because the front end of the single ferrule attempts to make the seal against the axially elongated camming surface. The radially outward bowing action causes a larger portion of the outer surface of the front end of the single ferrule to come into contact with the camming surface against which it is being driven. The result necessarily is a larger seal surface area between the outer surface of the single ferrule and the camming surface. This enlarged seal area causes an unwanted distribution of the sealing force between the single ferrule and the camming surface, and also creates a larger area for surface imperfections to allow leaks to occur. This is particularly a metal to metal seal issue (as contrasted to non-metal to non-metal seals: for example, in a plastic fitting it is usually desirable to provide an enlarged seal contact area because the more highly ductile plastic material can better form a seal between the two surfaces.)

Because historically the single ferrule fitting has used a shallow camming angle to achieve adequate tube grip, the less than optimum seal function is either tolerated as a recognized limitation on the application of the fitting, or additional features have been designed into the single ferrule fitting, most notably attempts to include one or more elastomeric seals with the single ferrule or with which the single ferrule cooperates to provide a better seal with stainless steel tubing. See, for example, U.S. Pat. Nos. 6,073,976 and 5,351,998. U.S. Pat. No. 6,073,976 illustrates a typical example of a single "ferrule" (called a "cutting ring" in the patent) fitting that attempts to solve the "seal" issue with added elastomeric seal.

The U.S. Pat. No. 5,351,998 patent describes the benefits obtained by separating the tube grip and seal functions into two separate components.

A commercially available and highly successful two ferrule fitting used for tubing is commercially available from Swagelok Company, Solon, Ohio and is described in U.S. Pat. Nos. 5,882,050, 6,131,963 (the "'963 patent" hereinafter) and U.S. Pat. No. 3,103,373 all of which are owned in common by the assignee of the present invention, the entire disclosures of which are fully incorporated herein by reference. In these two ferrule fittings, the tube grip and seal functions also are separately achieved by the use of two ferrules. The forward or front ferrule provides an excellent seal even against gas, and the back or rear ferrule provides an excellent tube grip.

The front ferrule achieves an excellent seal by camming against a shallow camming surface angle such as twenty degrees. This is because the front ferrule does not need to slide excessively on the camming surface in order to achieve a tube grip function. Likewise, the front ferrule is not case hardened because the primary purpose of the front ferrule is to seal and is not to bite into the tube end. Thus the relatively "softer" front ferrule achieves an excellent seal, particularly against gas, even though the body conical camming surface presents a camming angle of about twenty degrees.

The back ferrule achieves the tube grip function in the above noted two ferrule tube fitting. The back ferrule is case hardened to be substantially harder than the tube end. The front end of the back ferrule cams against a frusto-conical camming surface formed in the back end of the front ferrule. The ostensible angle of this camming surface is forty-five degrees, but due to the sliding movement of the front ferrule, the effective camming angle is actually a shallow angle of about fifteen to twenty degrees. Although the effective camming angle for the back ferrule is shallow, the back ferrule is not required to provide a primary seal (although it can form secondary or backup seals). The back ferrule also does not exhibit the undesired bowing action but rather grips the tube end as a function of a radially inward hinging action. As used herein, the term "hinging" refers to a controlled deformation of the ferrule such that a central region or mid-portion of the ferrule body undergoes an inwardly radial compression, as distinctly contrasted to a bowing or radially outward displacement. Thus, the effective shallow camming angle not only does not compromise the fitting seal capability, it actually substantially enhances the overall performance of the tube fitting especially for stainless steel tubing.

By using separate ferrules for each to achieve primarily only one of the key tube fitting functions, the two ferrule tube fitting achieves tremendous tube grip and seal functions. This prior art two ferrule tube fitting thus has enjoyed tremendous commercial success especially in the art of stainless steel tubing in part due to its performance characteristics such as high pressure rating on the order of 15000 psi, wide temperature rating of cryogenic to 1200° F. and in many applications a significant number of remakes (a "remake" refers to the loosening and re-tightening of a fitting after an initial pull-up).

U.S. Pat. No. 3,248,136 illustrates use of a single locking ring as opposed to a ferrule, wherein the locking ring acts against a surface having an angle that appears to be greater than twenty degrees or more, but the ring does not appear to plastically deform into the tubing but rather remains elastic so that the ring is designed to retain its original shape after pull-up, both of which are features that are unsuitable for stainless steel tube fittings of the type considered herein. Japanese utility model publication 44-29659 illustrates a tightening ring that appears to be intended to have a bowing effect and grip the tube at the front and back ends. The fitting does not appear to be applicable to stainless steel tubing as the tube is covered with a resin cover.

Many applications and uses of the described two ferrule tube fitting do not require such high pressure, temperature and remake performance characteristics. The present invention is directed to a new fitting concept that can meet lower performance characteristics without compromising overall fitting integrity and performance. Moreover, the present invention is directed to a new single ferrule tube fitting and variants thereof that can exhibit significantly improved performance over prior art single ferrule tube fittings, particularly for applications that do not require the high end performance characteristics of the above described two ferrule tube fitting.

SUMMARY OF THE INVENTION

In accordance with one aspect of the invention, a single ferrule tube fitting for stainless steel tubing or pipe is provided that achieves a significantly improved sealing function over prior single ferrule tube fittings while also achieving an excellent tube grip function. This sealing function is achieved without the use of additional elastomeric or other non-metal seals. In one embodiment, the single ferrule tube fitting utilizes a relatively steep camming angle for the camming surface of the fitting body. In accordance with this aspect of the invention, in one embodiment the camming angle is in the range of at least about 35 degrees to about 60 degrees, and preferably in the range of about forty to about fifty degrees and most preferred to be about forty-five degrees. In accordance with another aspect of the invention, a single ferrule tube fitting is provided that provides a primary seal against a relatively steeply angled camming surface. In the main embodiment this seal is formed by an outer tapered surface of the ferrule, that is not as steeply angled as the camming surface, being plastically deformed or coined with a generally narrow line contact against a camming surface angle within the above noted range. In accordance with another aspect of the invention, a single ferrule tube fitting with improved tube grip is contemplated by utilizing a case hardened ferrule with a geometry designed to enhance the ferrule tube grip. In one embodiment, the ferrule is case hardened to be at least about 3.3 times the hardness of the stainless steel tubing on the Vicker's hardness scale, more preferably at least 4 times the hardness of the stainless steel tubing. The case hardening may be over part or all of the ferrule surface. This allows the single ferrule to adequately bite into the hard stainless steel surface to grip the tube end even with a steeper camming angle and less axial travel. In accordance with another aspect of the invention, the single ferrule is plastically deformed during pull-up with a hinging effect. This hinging action produces a radially inward compression on a central or mid-portion of the ferrule body axially from a front end of the ferrule that bites into the tube end. This hinging effect places more ferrule material at the location of the tube gripping bite and produces a collet-type or swaging action of the central or mid-portion of the ferrule that helps isolate the tube gripping bite from vibration effects. In one optional embodiment, the ferrule geometry includes at least one interior circumferential recess to enhance the hinging action during pull-up. The hinging action also helps to cause the ferrule outer tapered surface optionally to have a generally narrow line contact with the camming surface. In additional embodiments the hinging effect may further be facilitated by the ferrule having a contoured back wall such as for example a convexity, or a tapered outer wall having an optional concavity. The various geometry options for the ferrule may also be selected to produce the desired hinging and colleting effect while optionally resulting in the back end of the ferrule to be radially spaced from the tube end after pull-up. The invention thus contemplates for a single ferrule tube fitting many options of ferrule geometry and material properties available to the designer in a wide variety of combinations and sub-combinations to achieve desired tube grip by hinging and colleting effects, and/or options for achieving desired sealing characteristics.

The present invention is also directed to a new tube fitting concept that utilizes only two components, namely a fitting body and a modified fitting nut. The nut and body are adapted to be threadably coupled by relative rotation therebetween or otherwise joined together. The nut, which may be for example a female threaded nut, includes an integral tube gripping ring that cooperates with a camming surface on the body when the fitting is made-up. The body includes a camming surface against which a forward portion or nose of the tube gripping ring is driven during pull-up. In accordance with one optional aspect of the invention, the camming surface is steeper than conventional teachings for tube fitting camming surfaces. In one embodiment the steeper camming surface is in the range of about thirty-five degrees to about sixty degrees. The tube gripping ring may be machined with the nut or separately attached thereto by any convenient process such as brazing, welding or soldering, for example. The ring is radially compressed and plastically deformed against the tube outer wall to form a seal and a tight tube grip bite. The ring also forms a seal against the steeper camming surface. In one embodiment, the ring includes an outer tapered surface, that is not as steep as the camming surface angle, forming a generally narrow line contact-type seal against the steeper camming surface. The ring in one embodiment is designed to have a hinging action and to plastic deform during pull-up to embed the nose portion into the tubing wall for excellent tube grip, and an axially adjacent swage or collet zone that isolates the embedded nose portion from vibration effects. The fitting components, and particularly the ring, are preferably but not necessarily case hardened. The new fitting is especially useful as a stainless steel tube fitting, although the invention is not limited to any particular class of metals. In accordance with another aspect of the invention, the fitting may include a self-gauging feature to indicate sufficient pull-up and to prevent excessive tightening of the components. The ring may optionally utilize one or more of the geometry and material properties described with respect to the single ferrule tube fitting, and vice-versa.

These and other aspects and advantages of the present invention will be apparent to those skilled in the art from the following description of the preferred embodiments in view of the accompanying drawings.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein:

FIGS. 3 and 4 illustrate another aspect of the invention with a self-gauging feature, and with the fitting shown in the finger-tight and pulled-up positions respectively;

FIG. 13 is another embodiment of the invention for a single ferrule tube fitting;

FIG. 13A is an enlarged view of a portion of the fitting of FIG. 13 to illustrate a difference angle concept;

FIG. 14 illustrates the fitting of FIG. 13 in a pull-up condition; and

DETAILED DESCRIPTION OF THE INVENTION

Figure 1:
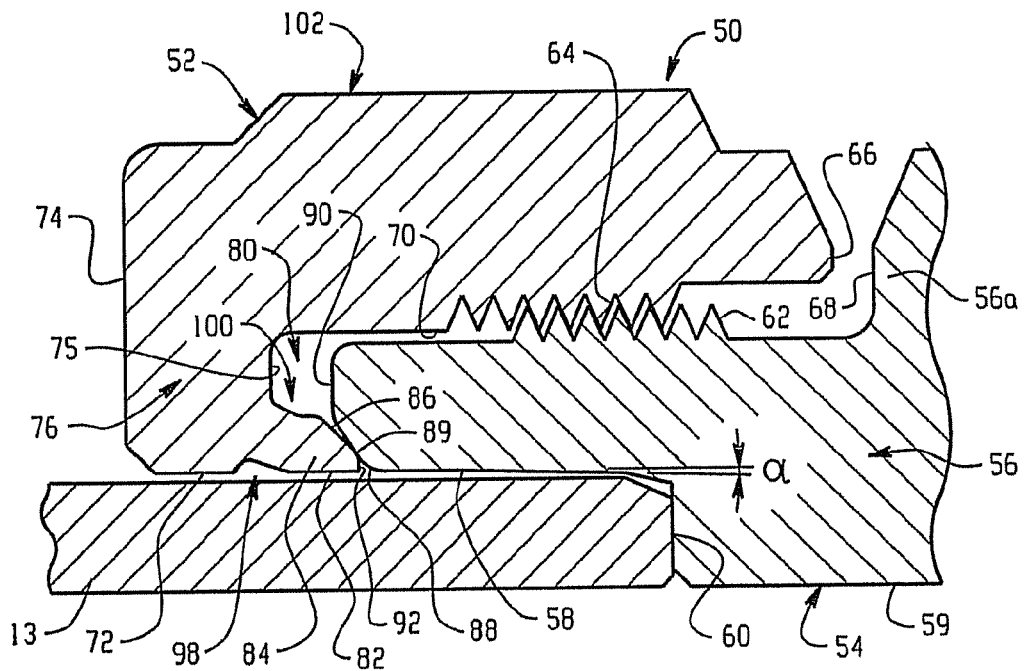
FIG. 1 illustrates in half longitudinal cross-section a first embodiment of a tube fitting in accordance with the invention in a finger tight position.

In accordance then with one aspect of the invention, a tube fitting is provided having a tube gripping device that acts against a steep camming angle surface of one of the fitting components. The steep camming surface angle is particularly advantageous when the hardness of the tube gripping device has a ratio of at least about 3.3 times and preferably at least 4 times on the vickers scale the hardness of the tubing material. The present disclosure utilizes these aspects of the invention in two distinct general embodiments. The first general embodiment that will be described is a tube fitting arrangement in which a tube gripping device is provided that is integral with one of the two threaded components, namely the female threaded nut component. The second general embodiment is that of a tube fitting for stainless steel tubing that uses a separate single ferrule as the tube gripping device along with the male and female threaded components. Both general embodiments may share a number of common aspects of the invention many of which are optional alternatives that can be used in a variety of combinations and sub-combinations, such as the camming surface profile, the camming surface angle, geometry options of the tube gripping device, and hardness characteristics of the tube gripping device relative to the tubing material.

Although a number of aspects of the invention are described herein as being incorporated into the exemplary embodiments, such description should not be construed in a limiting sense. For any particular application the various aspects of the invention may be used as required in different combinations and sub-combinations thereof. Furthermore, although the present disclosure describes and/or illustrates a number of design choices and alternative embodiments, such descriptions are not intended to be and should not be construed as an exhaustive list of such choices and alternatives. Those skilled in the art will readily appreciate and understand additional alternatives and design choices that are within the spirit and scope of the invention as set forth in the appended claims.

Although the various embodiments are described herein with specific reference to the fitting components being made of stainless steel, and in particular 316 stainless steel, such description is intended to be exemplary in nature and should not be construed in a limiting sense. Those skilled in the art will readily appreciate that the invention may be realized using any number of different types of metal materials for the fitting components, as well as metal tubing and pipe materials, including but not limited to 316, 316L, 304, 304L, any austenitic or ferritic stainless steel, any duplex stainless steel, any nickel alloy such as HASTALLOY, INCONEL or MONEL, any precipitation hardened stainless steel such as 17-4PH for example, brass, copper alloys, any carbon or low alloy steel such as 1018 steel for example, and any leaded, re-phosphorized or re-sulphurized steel such as 12L14 steel for example. An important aspect of the choice of materials is that the tube gripping device preferably should be case or through hardened to a ratio of at least about 3.3 and preferably 4 or more times on the vickers scale to the hardness of the hardest tubing material that the fitting will be used with. Therefore, the tube gripping device need not be made of the same material as the tubing itself. For example, as will be discussed hereinbelow, the tube gripping device may be selected from the stainless steel materials noted above, or other suitable materials that can be case hardened, such as magnesium, titanium and aluminum, to name some additional examples. While the invention is described herein with particular reference to a fitting for tube, use of the word "tube" herein should not be construed in a limiting sense, but rather it is intended that tube and pipe are used interchangeably as a general reference to metal conduits and that the invention covers both.

With reference to FIG. 1, the present invention contemplates a tube fitting 50 in which there are only two discrete components, namely a female threaded nut 52 and a male threaded body 54. The nut 52 is substantially different from the typical nut used in a prior art ferrule type tube fitting for metal tubing. The body 54 may be the similar in design as a typical body used in prior fittings, however, as will be explained further herein, it is preferred but not necessary that the body 54 also be optimized for proper make-up with the new nut 52. Additionally, the body 54 need not be a discretely separate component but may be attached to or otherwise integral to another part such as a valve body, manifold or other components for example.

Note that in the drawings the fittings are illustrated in longitudinal cross-section but only half of the section is illustrated, it being understood that the other half is identical and omitted for clarity and ease of illustration. In all of the illustrations herein, various gaps and dimensions are somewhat exaggerated for ease of illustration.

The body 54 is a generally cylindrical main body 56 that has an integral extension or end 56*a*. The end extension 56*a* may be a hex body, for example, or part of another component such as for example a valve body as noted hereinabove. The main body 56 may be machined from the same stock as the end extension 56*a* or may be otherwise attached such as by welding or other suitable technique. The body 56 includes a first central longitudinal bore 58 that is appropriately sized to closely and slideably receive a tube end 13. The first bore 58 is somewhat larger in diameter than a coaxial second bore 59 that extends through the end extension 56*a* of the body 54. Of course, if the fitting 50 is a closed end connection, the inner bore 59 would not be a through bore.

The tube end 13 preferably bottoms against a counterbore 60. The body 56 is machined or otherwise formed with external male threads 62 that threadably mate with corresponding female threads 64 formed or machined in the nut 52. It is contemplated that in order to avoid inadvertent mixing of old and new style body and nut parts with prior art fitting components, that the thread pitch on the nut and body of the present invention may be substantially different from the thread pitch values of prior art ferrule-type tube fitting nuts and bodies. This will avoid interchange problems and also allows for a course pitch that provides high axial stroke with reduced nut rotation for complete pull-up. For example, a fitting that incorporates the present invention may use course pitch threads that provide sufficient axial displacement to achieve proper pull-up in a half turn. A typical prior art fitting by comparison is pulled-up with 1¼ to 1½ turns. Nothing however prevents the designer from making the thread pitch any value suitable to a particular application, as there are other techniques to avoid interchange issues. Therefore, the one-half turn for pull-up is just one example of a variety of design choices available.

The central body bore 58 is preferably although not necessarily formed with a slight radially inward taper α relative to the longitudinal axis X (FIG. 1) of the tube end 13 such that the diameter of the bore 58 decreases radially in the axial direction towards the counterbore 60. For example, this taper may be about 2 degrees to about 4 degrees, although the selected angle is not particularly critical. The bore 58 diameter at the counterbore shoulder is just slightly less than the outer diameter of the tube end 13. In this manner, the tube end 13 has a slight radial interference fit of a few thousandths of an inch for example with the bore 58. This interference between the bore 58 and the tube end 13 provides an anti-rotation action to help prevent the tube end 13 from rotating during pull-up. This also reduces residual torsion stress that may be induced into the tube end due to rotation of the tube gripping element (80) during pull-up. The tube end 13 does not necessarily have to bottom completely against the counterbore shoulder 60. This is because the interference fit helps provide a good primary seal between the bore 58 and the tube end 13. The interference fit also helps improve the tube grip by the tube gripping element (80) by axially holding the tube end stationary during pull-up so that the full axial displacement of the tube gripping element (80) is used for proper deformation and tube grip rather than any lost axial motion or movement of the tube end during tightening. The taper of the bore 58 may extend gradually along its entire axial length or a shorter axial portion adjacent the counterbore 60.

Figure 2:
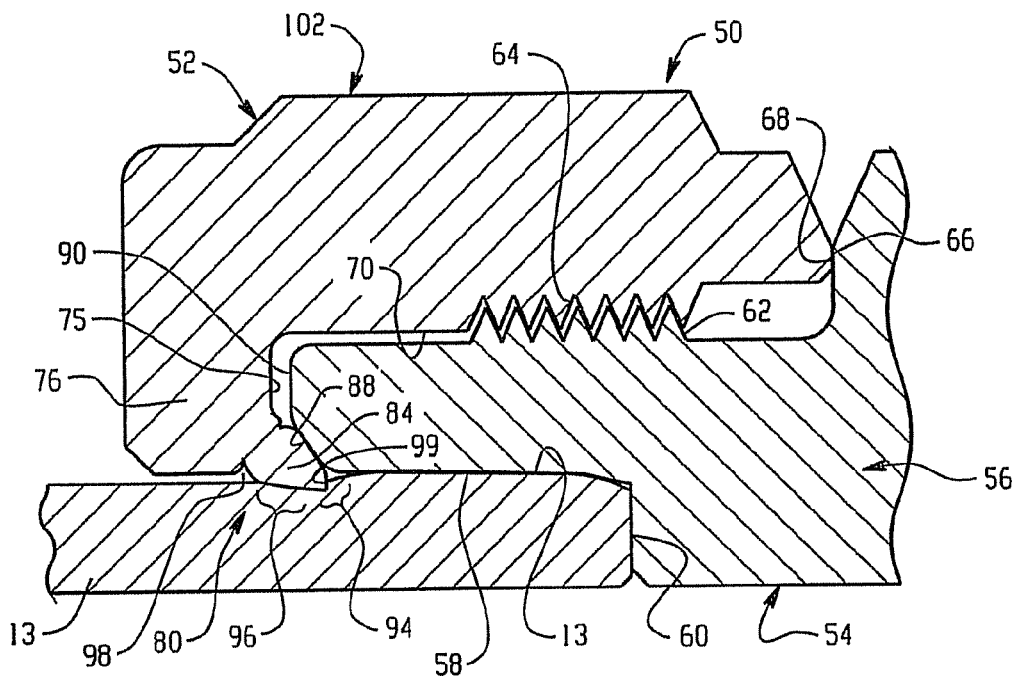
FIG. 2 illustrates the embodiment of FIG. 1 in a pulled up position.

In the embodiment of FIGS. 1 and 2, the nut 52 and body 54 are axially dimensioned so that upon proper pull-up, for example a one-half-turn of the nut 52 relative to the body 54, a forward end 66 of the nut axially contacts an end shoulder 68 or other axial stop surface of the body 54. This feature thus incorporates a self-gauging aspect to the fitting 50 to thereby indicate sufficient pull-up and to prevent over-tightening of the nut 52. However, for those situations where it may be desirable to permit additional axial displacement of the nut 52 relative to the body 54, such as for example, remakes of the fitting 50, the nut 52 and the body 54 may be axially dimensioned to retain an axial gap therebetween (for example, between the respective ends 66 and 68) upon completing an initial proper pull-up. In the latter case, a gauging tool may be used to verify proper initial pull-up, such as for example, a gap measuring device to confirm that the axial gap between the surface 66 and 68 does not exceed a predetermined value or dimension. The stop feature may also be used to implement a limited number of remakes for the fitting 50.

Figure 3:
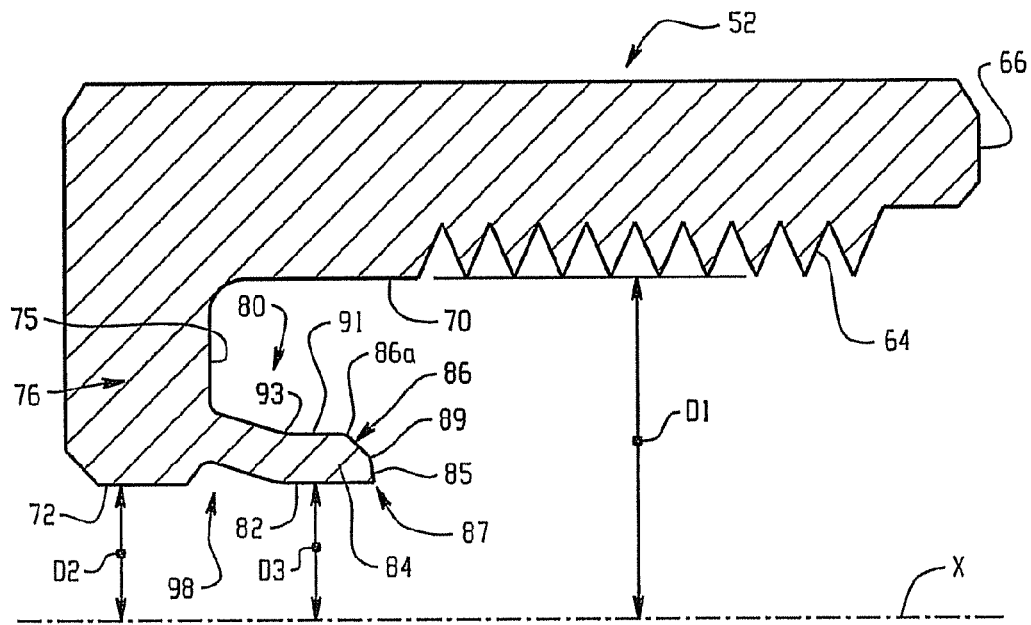
FIG. 3 illustrates an integral nut and tube gripping device in accordance with the invention.

With reference also to FIG. 3, the nut 52 includes a first central bore 70 having a first diameter D1 relative to the longitudinal axis of the fitting 50. The nut 52 also includes a second bore 72 having a second diameter D2 relative to the central longitudinal axis of the fitting 50. In this embodiment, the diameter D2 is less than the diameter D1. Furthermore, the diameter D2 is sized so that the bore 72 defines a generally cylindrical wall that receives the tube end 13 (FIG. 1). The first bore 70 terminates at a location that is axially spaced from the nut back end 74 to form a trepan 75, such that the nut 52 includes a radially inwardly extending collar 76. The collar 76 is defined by the back end wall 74 of the nut 52, the smaller diameter bore 72 and the larger diameter bore 70.

In accordance with a significant aspect of the invention, the nut 52 includes a tube gripping device 80 that extends axially inwardly in a somewhat cantilevered fashion from the collar 76. The tube gripping device in this example is in the general form of a gripping ring 80 and includes an inner bore 82 that defines a substantially cylindrical wall that closely receives the tube end 13 (FIG. 1). The diameter D3 of the ring bore 82 may be the same as or different from the diameter of the second nut bore 72. The cylindrical wall that defines the gripping ring bore 82 extends axially from a tapered front or nose portion 84 of the gripping ring 80. The nose portion 84 includes an axially tapered outer surface 86 that increases in the radial dimension towards the back end of the ring 80. The tapered outer surface 86 extends from a generally radial front end 85 of the gripping device 80. This generally radial front end 85 may have a small angle or taper and joins to the inner cylindrical bore 82 at a preferably sharp corner 87. Alternatively, however, there may be provided a circumferential recess or step or notch or other geometry (not shown) in the front end of the ring 80 having a diameter that is somewhat larger than the diameter D3 and axially extending from the front end 85 towards the back end 74 of the nut 52.

The tapered surface 86 joins the front end 85 preferably by a radius portion 89 and at its axial opposite end by a radius 86*a* to a generally cylindrical portion 91, which in turn joins via a radius 93 to a tapered outer wall portion 95. The tapered outer wall portion 95 joins along a radius to the trepan 75.

It is noted at this point that the various geometry characteristics of the tube gripping device 80 (such as, for example, the various recesses, notches, tapered portions, radius portions and so on) are selected so as to effect an appropriate radially inward hinging action as will be further explained hereinafter. Accordingly, the geometry of a tube gripping device 80 will be determined by the characteristics of the material of the tubing such as hardness and the fitting components, the dimensions of the tubing and the required tube grip and seal performance needed for a particular application. Therefore, the specific embodiments illustrated herein are intended to be exemplary in nature and not limiting as to the geometry of the tube gripping device. By way of example, but without intending to be limiting, FIGS. 9-12 illustrate other geometry variations for the tube gripping device. The above referenced patents for the two ferrule fitting also illustrate additional geometry variations to facilitate the hinging effect to obtain a desired tube grip.

Figure 4:
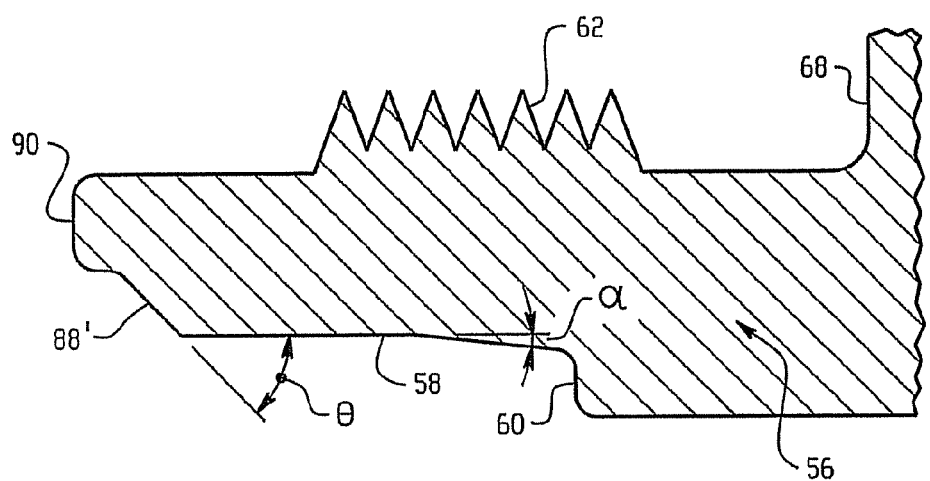

With reference to FIGS. 1, 2 and 4, the tapered nose portion 84 initially engages an axially tapered camming surface 88 that forms an opening to the tube bore 58 in the main body 56. The tapered camming surface 88 is a surface that joins the bore 58 wall to the back end wall 90 of the body 54. In the embodiment of FIGS. 1 and 2, this camming surface 88 is characterized by a generally convex contour. However, the shape of the surface 88 may be selected for other shapes depending on the particular ring deformation and tube gripping characteristics required for the fitting 50 in a specific application. Thus, as illustrated in FIG. 4, the camming surface 88' may be of a frusto-conical shape for example. Note also that FIG. 4 illustrates the concept that the axially tapered tube bore 58 may be tapered only at an axially shorter portion adjacent the counterbore 60.

The tube gripping ring 80 is shaped to effect several important functions of the fitting 50. The gripping ring 80 must, upon proper pull-up, provide a fluid-tight primary seal against the tapered camming surface 88. This seal may be a primary outer seal for the tube fitting 50, or may be in effect a secondary or back-up seal to any seal formed between the tube end 13 and the body 54, for example along the bore wall 58 and/or the counterbore 60. The gripping ring 80 also will form a primary seal at the location where the ring 80 bites into the outer surface of the tube end 13 in the area where the cylindrical bore 82 of the ring 80 engages the tube end outer surface. Again, this primary seal may in effect be a back-up or secondary seal to any seal formed by the tube end 13 against the body 54. In any event, the gripping ring 80 must form primary seals against the camming surface 88 and the outer surface of the tube end 13. In addition, the ring 80 must adequately grip the tube end 13 so as to maintain seal integrity under pressure, temperature and vibration effects, and to prevent the tube end from separating from the fitting under such circumstances.

In order to achieve a fluid-tight seal and tube gripping action, the ring 80 is designed to be plastically deformed and swaged into the tube end upon pull-up, as illustrated in FIG. 2. This result is achieved by designing the ring 80 to have a hinging action whereby the tapered nose portion 84 is not only driven axially forward as the nut 52 is threaded onto the body 54, but also is radially displaced or driven into engagement with the outer surface of the tube end 13 wall. The forward end 92 of the nose portion 84 is thus compressed and embedded into the tubing wall with a resultant stress riser or bite in the region designated 94 in FIG. 2. The front end bite 94 produces a generally radially extending wall or shoulder 99 formed out of the plastically deformed tube end material. The shoulder 99 engages the embedded front end of the gripping ring 80 to thus form an exceptionally strong mechanical resistance to tube blow out at higher pressures. The embedded nose portion 92 thus provides both an excellent seal and a strong grip on the tube end 13. The ring 80 is further designed to exhibit the aforementioned radially inward hinging action so as to swage or collet the cylindrical wall 82 against the tube end at a location axially adjacent or rearward of the stress riser bite 94 and generally designated with the numeral 96. This swaging and collet effect substantially enhances the tube gripping function and serves to isolate the embedded nose portion and bite 94 from the effects of down tube vibration and also temperature changes.

Although the present invention is described herein in the various embodiments as effecting an embedded nose portion and attendant swaging action, those skilled in the art will appreciate that in some applications such rigorous design criteria may not always be required, particularly for fittings that will be exposed to moderate temperature, vibration and pressure effects. Therefore, one of the basic concepts of the present invention is the provision of a flareless tube fitting that does not use one or more ferrules, but rather uses a tube gripping ring that is integral with one of the threaded fitting components. The additional design aspects of the nut, body and gripping ring set forth herein as preferred embodiments should therefore not be construed in a limiting sense but rather as selectable enhancements of the basic concepts of the invention to be used as required for particular applications.

In order to achieve the desired swaging action and tube grip, the ring 80 is designed to exhibit the hinging action that allows the tapered nose portion 84 and the central or midportion (as at the region of the cylindrical bore 82 or the region designated 94) of the gripping ring 80 to be radially inwardly compressed as it engages with the tapered camming mouth 88 of the body 56. This hinging action is also used to provide a significant radial displacement and compression of the cylindrical wall 82 to swage the ring 80 onto the tube end 13 axially adjacent to the stress riser 94. In the embodiment of FIGS. 1-4, the hinging action is facilitated by providing a preferred although not uniformly required radial inner circumferential notch 98 that is axially positioned between the cylindrical portions 72 and 82. The notch 98 is suitably shaped to permit the ring 80 to plastically deform and collapse in a controlled manner so as to radially compress the cylindrical wall 82 against the tube end with the desired collet effect. This result may be enhanced by including an outer notch 100 in the outer wall portion of the gripping ring 80. The particular geometry of the gripping ring 80 will thus be designed so that as the nut 52 is threaded onto the body 54, the gripping ring hinges and plastically deforms to grip the tube end and to seal both against the tube end and the tapered camming mouth 88. Standard design procedures such as Finite Element Analysis may be used to optimize the geometry of the ring 80 based on variable factors such as the tubing material, tubing hardness and wall thickness, and required pressure, temperature and vibration performance characteristics.

Proper deformation of the gripping ring 80 may further be controlled by selecting an appropriate contour for the tapered surface 88. This surface engages the tapered nose of the ring 80 and therefore will in part determine the timing and manner of how the ring 80 hinges, compresses and plastically deforms to properly embed the nose portion to bite into the tubing and also provide the desired collet or swaging action. Furthermore, the contour of the camming surface 88 may be designed to achieve the desired seal between the ring 80 nose portion and the tapered surface 88. This seal is important to the overall performance of the fitting, as is the seal provided between the gripping ring 80 and the tube end 13.

The nut 52 with its integral gripping ring 80 may be manufactured by standard machining operations, and will typically include a trepan operation to form the outer contour of the ring 80, such as the second notch 100 for example. The other features of the nut 52 can be realized with well known machining operations. Preferably but not necessarily the nut 52 includes wrench flats 102 to permit the user to tighten the nut 52 onto the body 54. Those skilled in the art will readily appreciate that use of the fitting 50 only requires relative rotation between the nut 52 and the body 54, such that either component or both may be rotated as required during a pull-up operation.

We have found that it is highly desirable for the camming surface 88 to form a camming angle θ of about 35°-60° relative to the longitudinal axis X of the fitting 50 and tube end 13. More preferably the angle θ of the camming surface 88 should be 40 degrees-50 degrees, and most preferred the angle θ should be about 45 degrees. This range of angles for the camming surface 88 differs dramatically from known metal tube fitting designs. Commonly used tube fittings have camming surface angles in the range of 10 degrees-25 degrees, which is a substantially shallower angle compared to the present invention. The shallower camming angle is necessary in prior art fittings to have the ferrule slide a greater axial distance along the camming surface because some prior art ferrules did not have a high differential hardness. The shallower camming angle provides a gradual ramp or mechanical advantage to convert axial nut load against the ferrule into amplified load of ferrule front end radially into the tube. This greater sliding action permits the tube gripping device to be more gradually radially deformed into the tube end to form a gripping action or bite on the tube. This greater sliding action also permits a gradual digging of the ferrule front end into the tube and plowing up an accumulation of deformed tubing material. Prior tube fittings that included what might appear to be a steeper camming angle actually either rely on a shallow portion of the camming surface or do not produce a bite in the tubing, thereby limiting the pressure resistance of the fitting. The shallow camming angle of the prior art, however, compromises the ability of a single ferrule to form a dependable seal and moreover necessitated a ferrule front portion that was not particularly strong because the nose of the ferrule had to be similarly tapered to slide into the shallow camming mouth. In sharp contrast, the present invention utilizes a substantially steeper camming surface angle θ, which permits the gripping ring nose portion 84 in effect to be coined into the camming surface 88 without a substantial sliding action, thereby forming an excellent seal. Those skilled in the art will appreciate however that the steeper camming angle is optional and not required in all applications, particularly for applications in which a strong seal such as against gas is not required.

In the exemplary embodiments herein, the nose portion 84 includes the radius portion 89 that transitions to the outer tapered surface 86. This outer surface 86 tapers generally at an angle that is not as steep as the angle of the camming surface 88. The tapered outer surface 86 preferably tapers axially with an increasing radial dimension towards the back end of the gripping ring 80. This tapered outer portion 86 and/or radius portion 89 contacts the camming surface 88 with, in effect, a generally narrow zone or line contact upon pull-up that has high stress and material coining to allow the front end of the gripping ring 80 to coin into the camming surface 88. The term "generally narrow line contact" is not intended to preclude an additional area of contact between the outer tapered surface 86 and the camming surface 88, but applies more generally to the concept of a localized contact zone near or at the innermost extent of the camming surface 88 of high stress and material coining between the outer tapered surface 86 and/or radius portion 89 against the camming surface 88. By "coin" is simply meant that the gripping ring 80 achieves a good metal to metal seal against the camming surface 88 by forming a generally narrow circumferential line contact of metal burnished on metal to effect a gas tight primary seal.

It is important to note that the use of a particular camming angle is not dependent necessarily on the contour of the surface 88. In other words, the angle of interest is the angle at which the front end of the gripping ring 80 contacts the camming surface 88 to form a seal thereat. Thus, the camming surface 88 may indeed be made with a non-frusto-conical contour, such as the convex shape illustrated in FIGS. 1 and 2, but the seal is still formed by the front end of the gripping ring 80 contacting a steep angled surface 88. The additional compound angles or contours of the camming surface 88 may be used to better facilitate the hinging action and tube bite achieved by the gripping ring 80.

Whether the camming surface 88 is formed as a compound angled surface with additional angled portions that are steeper or shallower to facilitate the hinging action and bite of the gripping ring 80 into the tube end 13, in accordance with this aspect of the invention, the sealing portion of the front end of the gripping ring 80 (in the exemplary embodiments the radius portion 89) forms the primary seal on a steep angled portion of the camming surface 88, preferably a steep angled portion in the range of angle θ of about 35 degrees-60 degrees relative to the longitudinal axis X of the fitting 50 and tube end 13, more preferably the angle θ of the camming surface 88 should be 40 degrees-50 degrees, and most preferred the angle θ should be about 45 at the location where the primary seal is to be formed. Preferably although not necessarily this primary seal is effected by a line contact type engagement between the front end of the gripping ring 80 and the camming surface 88.

The steeper camming surface angle has the additional benefit that the nose or front portion of the tube gripping device 80 may be formed with substantially more mass as compared to if the front portion had to engage a shallower camming surface angle as in the prior art single ferrule and gripping ring designs. This added mass, along with the hinging action, tends to position a substantially greater mass of material at or near the location of the tube bite 94. This significantly strengthens the tube gripping device in resisting pressure and also strengthens the collet effect that isolates the bite from vibration and temperature effects, as contrasted to prior art single ferrule or gripping ring designs. The greater mass at the forward portion of the ferrule along with the differential hardness, has the added benefit of allowing a positive rake angle γ to help the front edge of the ferrule indent into the tube end. With the ferrule front end deforming to some extent as it embeds into the tube wall, a positive rake angle γ is less likely to become greater than 90 degrees. If the rake angle were to become greater than 90 degrees it could tend to direct the ferrule front end out of its tube indent. The hinging action also prevents the back end of the tube gripping device (i.e. the end opposite the nose end 84) from contacting the tube end, so that the entire tube gripping device is in axial and radial compression.

In general, for a tube gripping device to embed into, bite and grip the tube end, the tube gripping device must be harder than the tube end. This is especially so for thick wall tubing. The greater axial movement of a ferrule in a shallow angle camming mouth of the prior art allows a ferrule to embed into a tube even when the ferrule is only moderately harder than the tube. Under these circumstances if the tube gripping device 80 were only moderately harder than the tube end, the device would be unable to adequately grip the tube for a steep angle camming surface because of the substantially shorter axial movement of the tube gripping device during pull-up caused by the steeper camming angle. However, in accordance with the present invention, by making the tube gripping device significantly harder than the tubing, a steeper angle camming surface may be used and is effective to cause the tube gripping device to adequately bite into the tube end to grip the tube.

The steeper camming angle θ of the present invention also results in a much shorter distance of axial displacement of the ring 80 during pull-up. Consequently, the nose portion 84 will need to be radially deformed and compressed into the tube end 13 with a much shorter axial displacement or sliding movement. In order to achieve the proper tube grip then, the gripping ring 80 is preferably case hardened to a hardness of at least about 3.3 times on the vickers scale harder than the tubing material. For example, if the tubing material is stainless steel, it may exhibit a hardness of up to about 200 Vickers. Therefore, in accordance with this aspect of the invention, when the fitting 50 is used with such hard materials, the tube gripping device should be hardened to a ratio of at least about 3.3 times the hardness of the tubing. More preferred, the tube gripping device should be hardened to a ratio of at least 4 times harder than the tubing. Still further, the entire gripping ring 80 need not be case hardened, but rather only the nose portion 84 may be selectively case hardened.

In accordance with this aspect of the invention, all or part of the nut 52 and body 54 may be through hardened or case hardened to increase the tube grip of the fitting 50 when used with harder tubing materials such as stainless steel. Suitable case hardening processes are fully described in U.S. Pat. Nos. 6,547,888, 6,461,448, 6,165,597 and 6,093,303 issued to the assignee of the present invention, the entire disclosures of which are fully incorporated herein by reference. These processes produce a hardness of the tube gripping device of about 800 to 1000 Vickers or higher without compromising the corrosion resistance of the fitting. Other case hardening techniques however may be used as required. Case hardening of the tube gripping ring 80 allows the ring 80 to adequately grip and seal against tubing materials such as stainless steel including duplex stainless steel. The above referenced case hardening patents have an additional benefit of providing surfaces on the ring 80 that reduce or prevent galling between the ring 80 (which rotates with the nut 52) and the tubing.

Various lubricants may also be used with the tube gripping ring 80 to reduce galling and residual torsion such as, for example, PTFE greases, and greases containing molybdenum disulphide or tungsten disulphide.

Case hardening techniques typically will result in the entire nut 52 and integral tube gripping ring 80 to be case hardened. When the case hardening is performed on stainless steel, for example, as in the above referenced patents or patent application, an adherent oxide skin is formed. In another embodiment of the invention, a solid lubricant may be applied to the threads of the stainless steel nuts 52 to reduce friction and the hence pull-up torque during tightening. Any solid lubricant can be used for this purpose and many such solid lubricants are well known. A few examples are graphite, molybdenum disulfide, tungsten disulfide and UHMWPE (ultra high molecular weight polyethylene). These lubricants can be used neat, i.e. not combined with another material, or mixed with another material such as a resinous carrier or the like. In addition, they can be used in essentially any solid form including powders, granules and pastes.

Solid lubricants of this type are well known commercial products. Examples include Dow Corning® 321 Dry Film Lubricant available from Dow Corning Corporation of Midland, Mich. and Slickote® Dry Lube 100 available from Trans Chem Coatings, of Monrovia, Calif.

These lubricants can be applied by any standard method such as by hand, by aerosol or air spraying or by automatic equipment. Any coating thickness can be used which will provide lubricating properties. Solid lubricant thickness exceeding standard class 2 thread clearances are usually not required. If appropriate, the lubricant can also be heated to enhance its adhesion. For example, some lubricants, especially those supplied in a resinous binder, can be heated to effect cure of the binder. For example, Slickote® Dry Lube 100 can be heated following manufacturer's instructions to 300 degrees F. for 1 hour, for example.

In a particular embodiment of the invention, a dry lubricant as described above is used on stainless steel nuts 52 which have been subjected to low temperature carburization using carbon monoxide as the carbon source. Stainless steel is stainless because of the thin, coherent chromium oxide film which inherently forms when the steel is exposed to air. Low temperature carburization of stainless steel parts, such as those made from AISI 316 and 316L stainless steel, usually leaves the part surfaces coated with some to a slight amount of soot. Before use this soot is usually removed by washing. When carbon monoxide is used as the carbon source in low temperature carburization, not only can soot form but in addition a heavy oxide film also forms. This heavy oxide film is considerably different from the coherent chromium oxide film which makes stainless steel stainless in that it is thicker and evidently not passive. Typically this film is also removed before use to uncover the part's carburized surface.

In accordance with this particular embodiment, this heavy oxide film is not removed before application of the solid lubricant. Rather, it is left on the carburized part surfaces, or at least the portions of the carburized surfaces to be lubricated. In accordance this particular embodiment, it has been found that the naturally porous structure of this heavy oxide skin acts as an anchor for binding the lubricant to the part surfaces. As a result, the lubricant is more adherent than would otherwise be the case, and hence is able to withstand repeated fitting remakes (i.e., loosening and retightening of the nut) without being removed. Other aspects of the lubricated oxide film is described in co-pending U.S. patent application Ser. No. 10/358,946 filed on Feb. 5, 2003 for LUBRICATED LOW TEMPERATURE CARBURIZED STAINLESS STEEL PARTS the entire disclosure of which is fully incorporated herein by reference.

Figure 5:
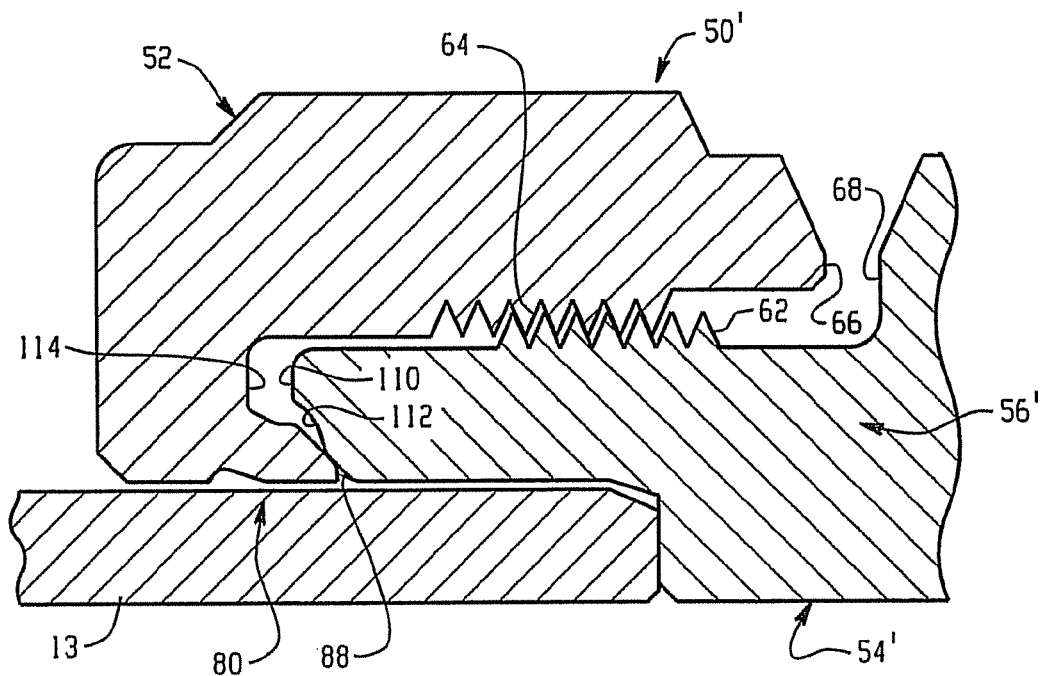
FIGS. 5 and 6 illustrate another embodiment of a gauging feature of the invention.
Figure 6:
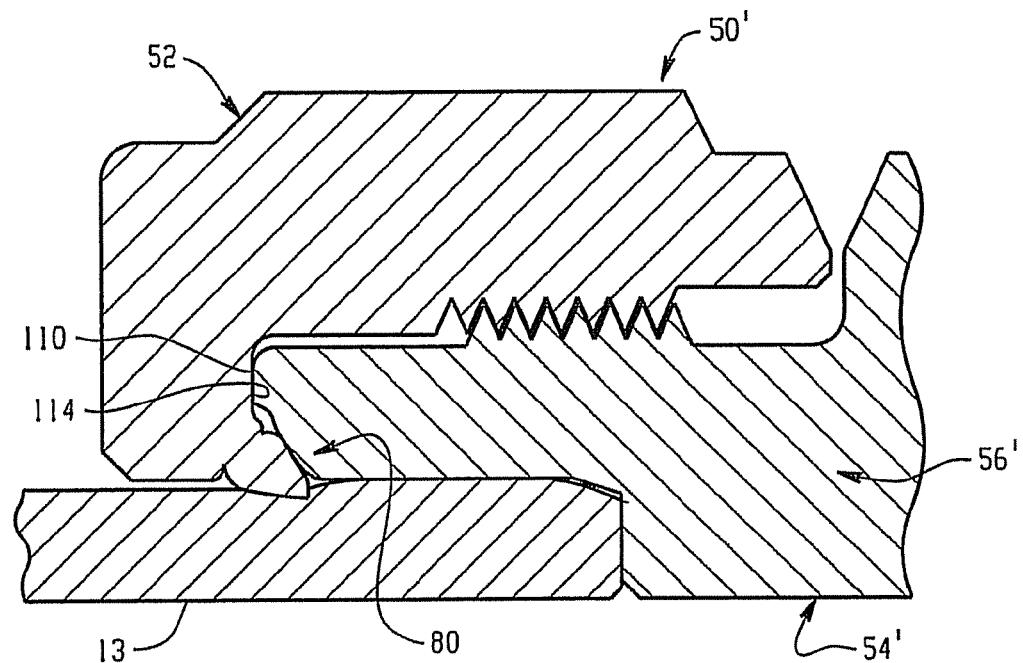

With reference to FIGS. 5 and 6, in another embodiment of the invention, the fitting 50' includes a nut 52 that may be the same as the nut previously described hereinabove. The body 54' has been modified as follows. In this case, the body rear end wall 110 has been axially extended. A transition contour 112 may be used to join the end wall 110 to the axially tapered camming mouth 88. All other aspects of the fitting 50' may be the same as the fitting 50 as described with reference to FIGS. 1-4. The extended axial length of the end wall 110 causes the nut inner shoulder or trepan 114 to axially contact the body end wall 110 before the forward wall 66 of the nut engages the body end wall 68. This is illustrated in the pulled-up position of FIG. 6. In other words, the self-gauging feature has been located at the rearward portions of the nut and body and only requires close tolerance control in the trepan area and axial length of the body rear end wall 110, whereas in the embodiment of FIGS. 1 and 2, more dimensions and tolerances are involved in insuring accurate self-gauging due to a greater number of tolerance stack-ups.

In accordance with the invention, a single ferrule tube fitting is also contemplated. The single ferrule tube fitting will be designed with many of the same concepts and advantages achieved with the integral nut and tube gripping device design (and vice-versa) described herein (wherein now the single ferrule is the tube gripping device), particularly but not limited to the various optional features of hinging, tube bite, collet or swaging effect, contoured back wall, tapered outer wall with an optional concavity, optional use of an inner notch or recess, line contact at the camming surface, radially spaced back end after pull-up and high differential hardness ratio when compared to the tube end. Therefore, those benefits will not be repeated in detail, it being recognized that the integral nut and tube gripping ring functions much like the single ferrule embodiment herein but with the ferrule being integral with the female threaded nut.

Figure 7:
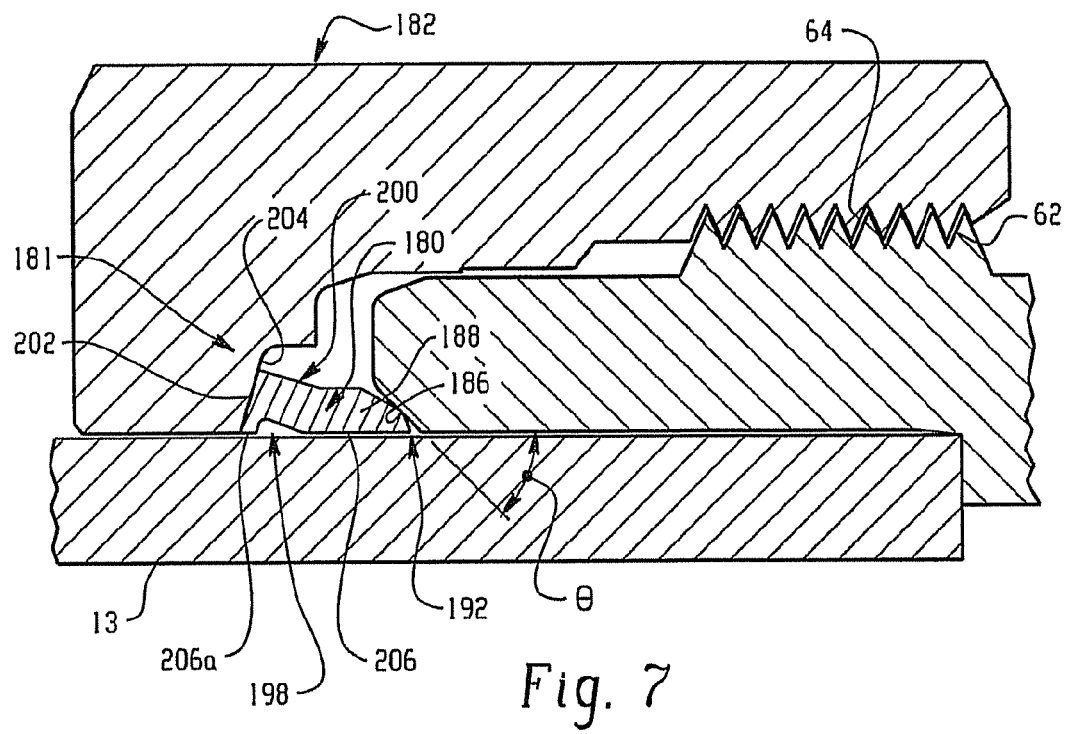
FIGS. 7, 7A and 8 illustrate half longitudinal cross-section views of single ferrule and camming surface of a single ferrule tube fitting in accordance with the invention in a finger tight position and pulled-up position respectively.
Figure 7A:
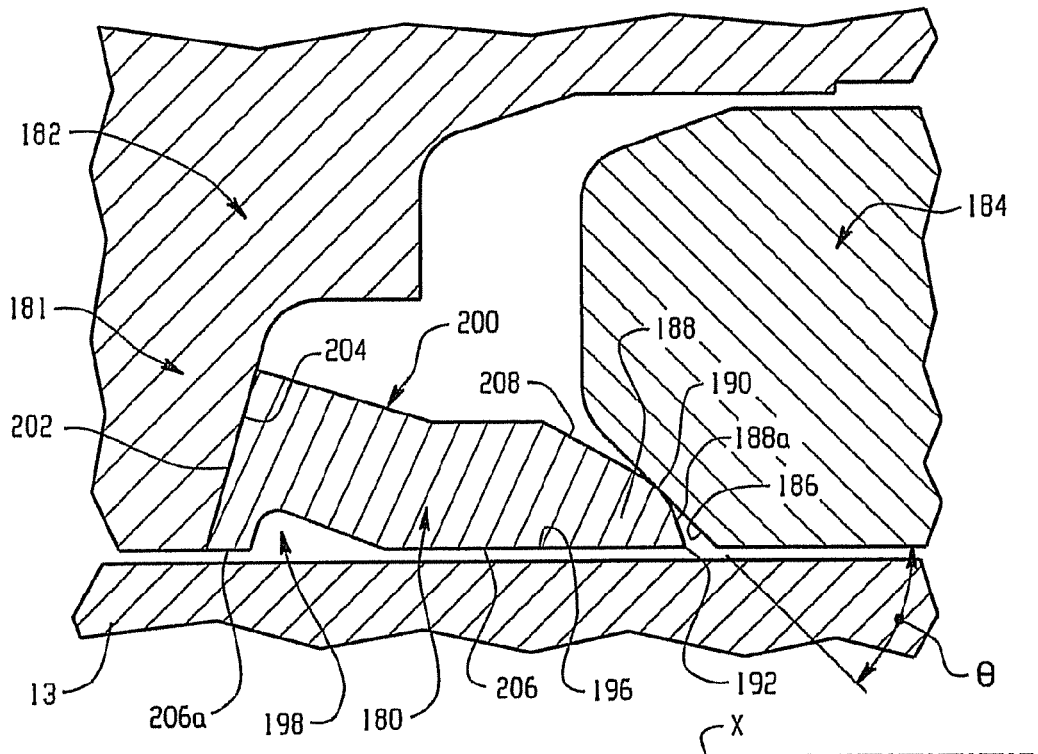
Figure 8:
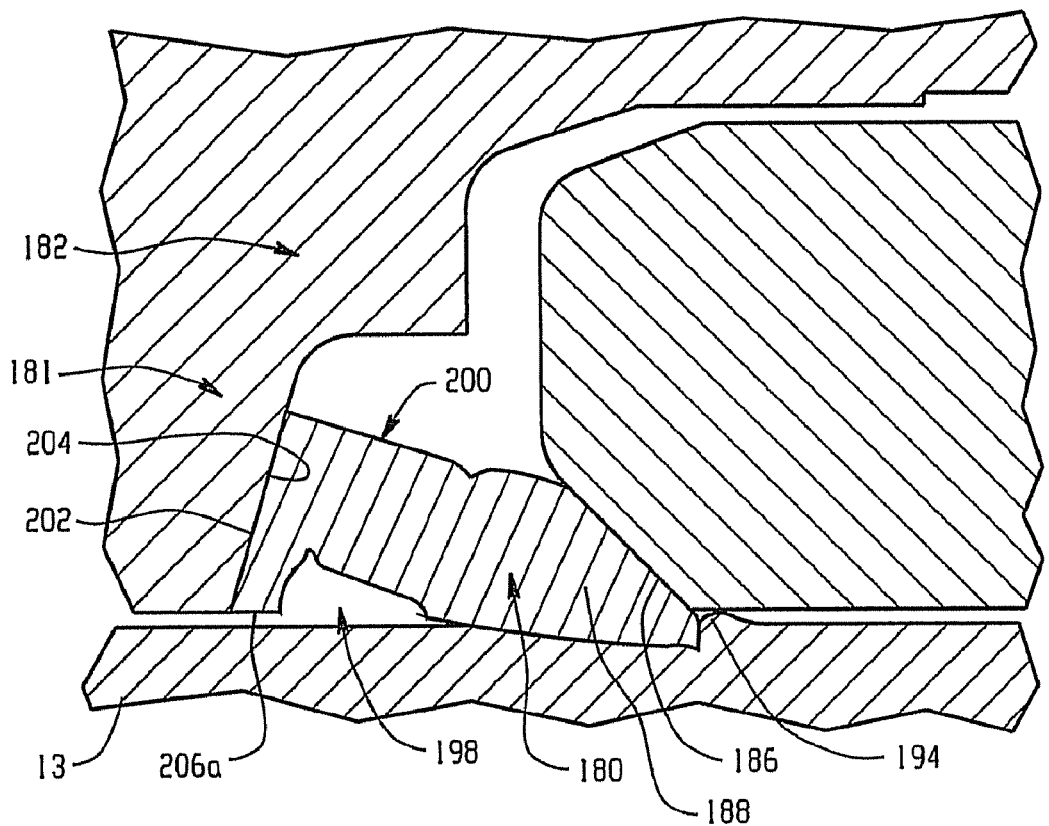
Figure 9:
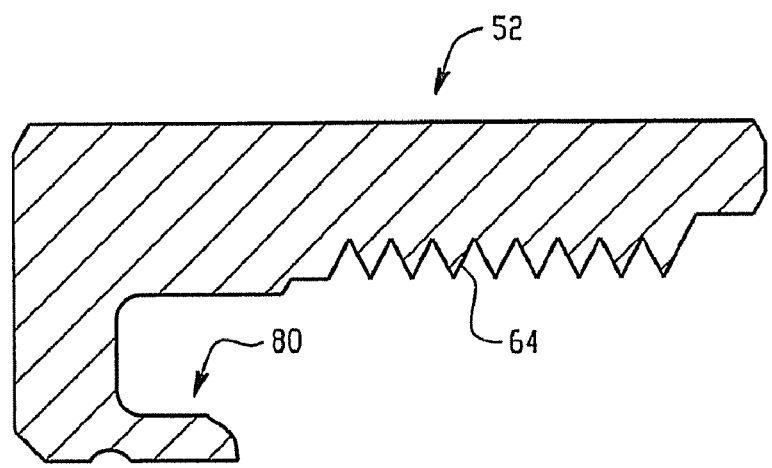
FIGS. 9-12 illustrate additional geometry examples for a tube gripping ring integral with the nut.
Figure 10:
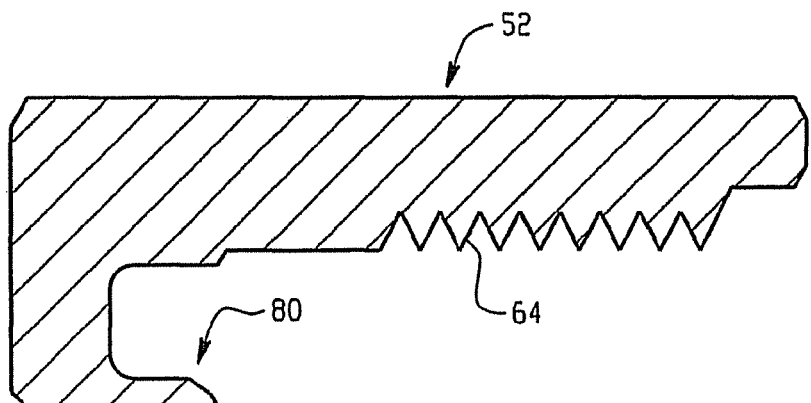
Figure 11:
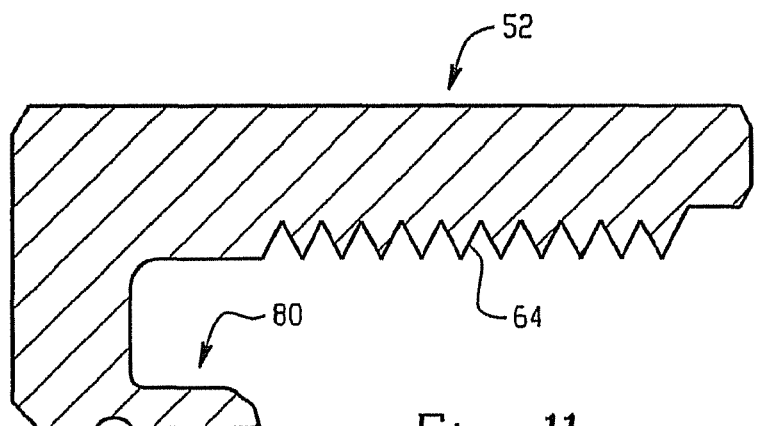
Figure 12:
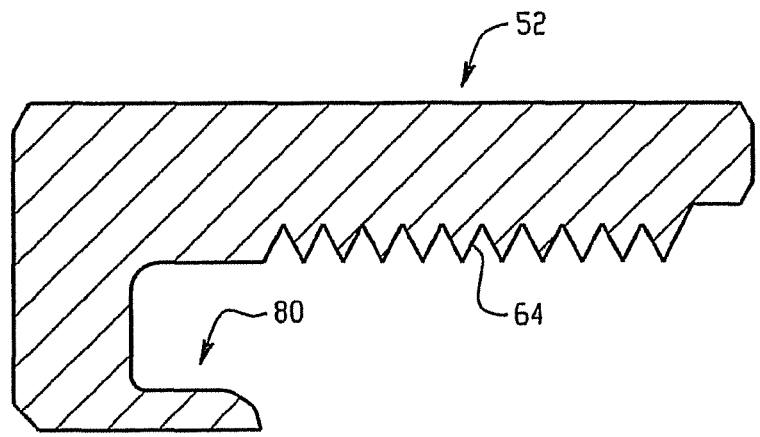

FIGS. 7, 7A and 8 illustrate a single ferrule tube fitting 181 embodiment of the invention. In this example, the ferrule 180 is a separate part, thus providing a three piece tube fitting 181 including a nut 182, body 184 and the single ferrule 180. This fitting is particularly although not exclusively well-suited for use with stainless steel tubing.

The body 184 includes an angled camming surface 186 that is preferably in the range for angle θ described hereinabove and most preferably about 45 degrees. The single ferrule 180 is also preferably case hardened to about a Vickers hardness of 800 or greater, or at least about 3.3 times harder than the tube end 13. The front portion 188 of the ferrule includes a radius transition 190 that contacts the steep angled camming surface 186 during pull-up of the fitting to form a line contact-type primary seal against the steep angled camming surface 186. The front portion 188 of the ferrule includes a generally radial front end surface 188a with a forward sharp edge 192 of the ferrule that bites into the outer surface of the tube end 13. The ferrule is plastically deformed and produces a generally radially extending shoulder 194 at the location of the tube bite. The ferrule 180 exhibits a hinging effect as described hereinbefore with respect to the tube gripping element 80 so that a central part or mid-portion 196 of the ferrule body undergoes a radially inward compression to collet or swage at or near the tube bite 194. The particular geometry of the ferrule may be selected as required to facilitate the hinging action and tube gripping bite and collet action as described hereinbefore and also as described in the above incorporated patents on the two ferrule fitting. The ferrule 180 may be provided with an inner circumferential notch or recess 198 to facilitate the hinging effect, as well as a tapered outer wall 200 as described hereinabove. The ferrule 180 includes a back tapered wall 202 that is driven by the nut shoulder 204 during pull-up. The ferrule 180 also includes a central longitudinal and substantially cylindrical bore portion 206 that is axially between the front end 188a and the recess 198. Preferably, the tapered nose portion 208 is angled so as to remain out of contact with the camming surface during pull-up to facilitate the formation of a line contact primary seal.

The cylindrical bore portion 206a that is axially between the back end 202 of the ferrule and the recess 198 may be the same diameter or a different diameter as the forward cylindrical portion 206. Furthermore, the hinging effect may be realized such that the back end portion 206a of the inner cylindrical bore remains radially spaced from and out of contact with the tube end 13 after pull-up.

The single ferrule 180 is through or case hardened to be at least about 3.3 times harder, and more preferably at least about 4 times harder, than the tube end 13. The aforementioned patents on case hardening may be referred to for suitable processes although other processes may be used as required.

The single ferrule fitting 181 thus provides excellent tube grip and seal functions compared to prior art single ferrule fitting designs by utilizing the steeper camming surface angle for the metal to metal seal, substantially harder ferrule compared to the tubing, and strong tube grip biting action. The substantially harder ferrule, as compared to the tubing hardness, allows excellent tube grip even with the steeper camming angle, while the steeper camming angle facilitates the metal to metal seal.

The invention as described hereinabove contemplates a number of aspects and features which may be applied to either or both the single ferrule and integral tube gripping ring embodiments that facilitate the principal although not exclusive performance characteristics of sealing and tube grip. For example, another performance characteristic that may be important in some applications is ability of the tube fitting to withstand temperature effects. Other criteria may include manufacturing cost, ease of assembly and assembly verification. The present invention provides the designer with a variety of aspects and concepts for designing a tube fitting that will meet the performance requirements of a particular application or range of applications. These different design aspects include various options on geometry and characteristics of the material of the tube gripping device (be it the single ferrule or integral tube gripping ring) as well as optional aspects of the tube fitting components such as the threaded male body and female nut of the exemplary embodiments No single aspect or feature of the invention or combinations thereof is absolutely necessary in all designs, and as an example the present invention may well find application in tube fittings that do not utilize a threaded coupling between the tube fitting first and second components that make up the fitting. In a broad sense therefore, the present invention provides a single ferrule (integral or separate) tube fitting that, unlike prior art single ferrule tube fittings, achieves tube grip and sealing by incorporating a hinging action as the ferrule plastically deforms during pull-up resulting in a colleting effect produced by a radial compression of a central portion of the ferrule against the tube end. This hinging action thus produces preferably although not necessarily in all applications a convex portion of the ferrule that is radially compressed against the tube end (whereas in the prior art single ferrule tube fittings the ferrule concavely bowed away from the tube end. The hinging and colleting effects allow for adequate tube grip even against harder tubing materials with a shorter camming stroke or axial displacement of the ferrule during pull-up, thus also assuring an adequate seal against the camming surface.

The various aspects and options available to the designer in accordance with the invention to achieve the desired tube grip and seal include but are not limited to the following. One aspect is the use of a steeper camming angle θ as set forth hereinabove. Another aspect is the use of hardening techniques, such as the exemplary processes described hereinabove, so that the ferrule/gripping ring is at least about 3.3 times harder than the tubing on the Vickers scale. The hardening may be case hardening or through hardening over part or all of the surface of the tube gripping device/ferrule. Still another aspect is the appropriate geometry of the ferrule/gripping ring to produce a hinging function or effect during pull-up of the fitting as described hereinabove so as to assure proper nose indentation into the tubing wall with a colleting or swaging effect axially behind the indentation. The ferrule/tube gripping device may be designed to bite into the tube end, as is typical in higher pressure applications, or to be radially compressed against the tube end, as is typical with thin walled tubing or softer tubing. The geometry considerations may include use of an inner notch/recess or concavity, use of an outer tapered wall with or without a concavity, and use of a contoured back wall, such as for example a convex surface. Additional geometry features may include the use of a radius portion to engage the camming surface with a generally line contact for effecting a strong seal as well as indenting the front edge of the ferrule into the tube wall to create a strong bite and tube grip. Another aspect is to design a hinging action whereby a rearward portion of the ferrule remains radially spaced from the tube end after a completed pull-up. This helps prevent the creation of a stress riser or region that would be otherwise susceptible to vibration effects down the tubing. Still another aspect is providing a difference angle between the drive surface of one of the tube fitting components and the associated ferrule driven surface, such as for example where the nut presses against the back end of the ferrule. The difference angle facilitates a proper hinging action to effectively collet the ferrule against the tube end and also facilitates the radial spacing of the ferrule rearward portion from the tube end.

Those skilled in the art will thus appreciate that the invention significantly adds to the state of the art of single ferrule tube fittings, particularly for the exemplary embodiment that combines the options of a steeper camming angle, differential hardness and the hinging action. These three aspects work together to result in a single ferrule tube fitting that exhibits good sealing and tube grip characteristics, unlike prior art single ferrule tube fittings. Moreover, in many applications the use of the hinging action and differential hardness alone will suffice.

We have found that for some applications of the single ferrule 180 (and hence also the integral tube gripping ring embodiments), particularly although not exclusively for ½" tubing and larger or for very hard tubing, the inner notch 198 is not required. In smaller tubing the inner notch may also be omitted for some applications, although in such cases proper hinging of the ferrule may be more difficult to achieve without the notch due to the higher rigidity of the smaller ferrules.

The hinging action is especially useful for applications when the tubing material is hard such as, for example, duplex stainless steel, so that the ferrule must be case hardened sufficiently to allow the ferrule nose to indent into the tubing wall. The harder the ferrule is made, the more difficult it is to deform the ferrule in a suitable manner to assure proper tube grip and seal. The hinging action allows the ferrule to properly deform and grip the tubing. For softer tubing materials such as copper for example, the steeper camming angle θ alone may be adequate to assure tube grip and seal.

As noted hereinabove, the hinging action may be effected by a variety of design options which may be used alone or in any number of various combinations and sub-combinations. One of those options is the inner notch or recess as noted. Another option is the tapered outer wall 200. Still further, the back end 202 of the ferrule may be contoured as explained in the '963 patent, such as with a convex shape, as distinguished from the straight conical profile illustrated in FIGS. 7 and 7A hereof. Using a convex contour with the ferrule back end 202 (or alternatively a contoured drive face 204 of the nut 182 or both) reduces galling and pull-up torque by more evenly distributing the reaction forces between the ferrule and the nut. Those skilled in the art will readily appreciate that the contoured back end may take on many different shapes, such as for example are described in International patent application no. PCT/US00/34828 filed on Dec. 20, 2000 for FERRULE WITH RELIEF TO REDUCE GALLING, and its corresponding U.S. patent application Ser. No. 09/469,549 filed on Dec. 22, 1999 for FERRULE WITH RELIEF TO REDUCE GALLING, now U.S. Pat. No. 6,629,708, the entire disclosures of which are fully incorporated herein by reference. The teachings of the these applications are not needed for an understanding and practice of the present invention, but rather provide additional alternative design configurations of a contoured back wall and other geometry considerations for the hinging operation, either for the rear ferrule of a two ferrule tube fitting, or a single ferrule tube fitting. The contoured back wall also facilitates a hinging action whereby the back end of the ferrule may be radially spaced from the tubing after pull-up as set forth hereinabove. Preventing contact between the ferrule back end and the tubing wall prevents a stress riser that could be susceptible to deleterious vibration effects.

With reference to FIG. 13, in another embodiment of the invention, a single ferrule tube fitting 300 is illustrated in partial longitudinal half cross-section in a loosely assembled condition on a tube end 13. In the drawing, as in the other drawings, various gaps and spaces are exaggerated for clarity and ease of understanding, as will be readily apparent to those skilled in the art.

The fitting 300 includes a ferrule 302, a body 304 and a nut 306 that is joinable to the body 304, such as for example by a conventional threaded connection therebetween. The body 304 includes a steep camming surface 304a as set forth hereinabove. In this embodiment, the ferrule 302 is a generally cylindrical device and made of any of the above-described exemplary materials and case hardening processes so as to preferably but not required in all cases have a differential hardness of at least about 3.3 times the hardness of the tubing material on the Vickers scale. The ferrule 302 includes a central bore through which the tube end 13 passes. The bore is defined by a substantially continuous cylindrical wall 308 that extends from a nose or forward portion 310 of the ferrule to a back or rearward end 312. The nose portion 310 may include a front edge 314 that joins to a tapered portion 316 by a radius portion 318.

The ferrule 302 in this exemplary embodiment further includes an outer wall 320 that may optionally have a crease, recess or notch or other concave form 322. This outer concave form 322 in this case is formed by a generally cylindrical wall portion 320a and an axially tapered wall portion 320b. The concave form 322 is similar in function to the tapered wall 200 of the embodiment of FIG. 7 hereof, and may be used to facilitate the radial inward compression of the ferrule 302 during pull-up to achieve the desired hinging operation that produces the indented nose 314 (and resultant stress riser) and collet region axially behind the indentation.

The ferrule further includes a contoured back wall 324. The contoured back wall 324 in this example may be in accordance with the teachings of the above-incorporated patent and patent applications, or as shown herein includes a generally straight conical portion 324a that joins to a radius or other convex shape 324b at the radial outer end of the back wall. By having the initial contact of the ferrule 302 and nut 306 along a contoured surface and radially spaced from the tube end 13, there is less galling during pull-up and lower torque needed for final assembly. This configuration also facilitates having the back end 312 of the ferrule radially spaced from the tube end after pull-up (see FIG. 14) as a result of the desired hinging operation.

As illustrated in larger scale in FIG. 13A, the ferrule back wall 324 generally has a contour convex shape so as to form an included angle β (referred to herein as a "difference angle") formed between a tangent Z to the outermost convex region of the surface 324 and the drive surface 306a of the nut. Thus, the form of the convex contoured surface 324 may be selected as needed for a particular application. Preferably the nut surface 306a initially contacts the convex surface 324 at a location that is radially spaced from the tube end. Although in the embodiment of FIG. 13A the initial contact is near or at the radial distal portion of the surface 324, such is not required. The initial contact for example could be more in the central region of the surface 324.

The use of one or more of the aspects including the contoured back wall 324, the difference angle β and the outer wall 320 (such as with a tapered portion and a concavity) facilitate the hinging action that produces a strong tube bite and colleting, as well as leaving the back end of the ferrule radially spaced from the tube end after pull-up of the fitting.

The forward portion 310 of the ferrule 302 includes the front edge 314 that preferably although not necessarily bites and indents into the tubing wall during pull-up. The forward end 310a of the ferrule extends generally radially from the front edge 314 at an angle γ which is the included angle formed with the central axis X of the fitting 300. The angle γ will depend on the overall design criteria for the fitting in each application, but this angle is important in achieving a strong bite into the tubing wall for a given axial stroke of the ferrule during pull-up beyond finger tight position. In most cases the angle will be in the approximate range of about 75° to about 85°.

Although the back end 312 of the ferrule 302 preferably is radially spaced from the tubing after pull-up, such may not be required in all applications. For those applications in which such spacing is required, another alternative is to form a recess such as a counterbore 313 (shown in phantom) in the back end 312 of the ferrule.

The hinging action for the invention and for all embodiments herein can be further understood with reference to FIG. 14. The hinging action, as distinguished from a bowing or concave deformation of the ferrule typical in the prior art single ferrule fittings, preferably involves a dual rotation effect represented by the directional arrows C1 and C2 in FIG. 14. The back end 312 of the ferrule rotates in a generally clockwise direction (herein the terms clockwise and counter-clockwise are used for a convenient reference based on the illustrated orientation of the drawing, rather than any required actual direction of rotation.) or away from the tube end 13, while the nose portion 310 rotates in a generally counter-clockwise direction (i.e. opposite to the rotation direction of the back end 312). This rotation of the nose portion thus contributes to the radial compression of a central portion 326 of the ferrule that is axially behind the indented nose portion 310. By "central portion" is meant a region that is between the front end and the back end of the ferrule and need not be in the middle of the ferrule. Rather, the central portion as used herein is that portion of the ferrule body that is radially compressed against the tube wall axially behind the indented front end. This radial compression produces the desired collating or swaging effect of a portion 308a of the inner cylindrical wall 308 axially behind the indented front end 314. The length of the collet region 308a will vary depending on the overall design characteristics of the tube fitting and performance requirements. The collet region 308a is axially behind the indented front edge but the precise location where the colleting begins is a matter of design choice so that it may be located adjacent to the indented nose and associated stress riser or may be axially spaced therefrom or contiguous with, to name a few examples. The collet region 308a as illustrated may also be characterized as a convex radial portion that compresses into the tubing wall in that the hinging operation preferably produces such a convex deformation of the cylindrical wall 308 during pull-up. Such an effect is readily distinguished from prior art fittings in which the ferrule either bowed concavely away from the tubing or for those ferrules that were through hardened would remain generally cylindrical in shape.

The dual rotation hinging operation is thus facilitated by the use of one or more of the various geometry features of the ferrule, including but not limited to the use of a contoured back wall of the ferrule, inclusion of a difference angle between the ferrule and the drive nut, and a concavity in the outer wall. Thus, those skilled in the art may select the best geometry features for the ferrule for a particular application to facilitate the use of a steep camming angle, and optionally the differential hardness of the ferrule.

We have found that a desirable collet result is one in which the compressive colleting stress acting normal to the tube surface gradually and generally decreases along the collet region from the location of the indented front end of the ferrule back along the interior wall 308. The desired collet effect is preferred in applications where it is desired to reduce or eliminate stress risers resulting from metal deformation during pull-up. By providing a generally decreasing colleting stress along the collating zone 308a, stress concentration regions near the trailing edge of the colleting zone opposite the indented nose can be reduced or eliminated.

Figure 15A:
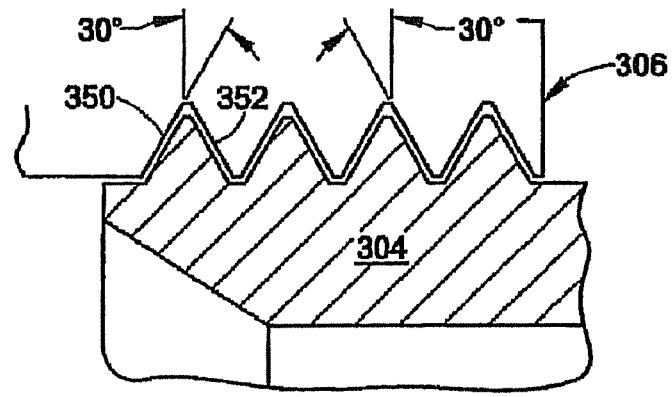
FIGS. 15A, B and C illustrate different thread options for the tube fitting components for a threaded coupling embodiment of the invention.
Figure 15B:
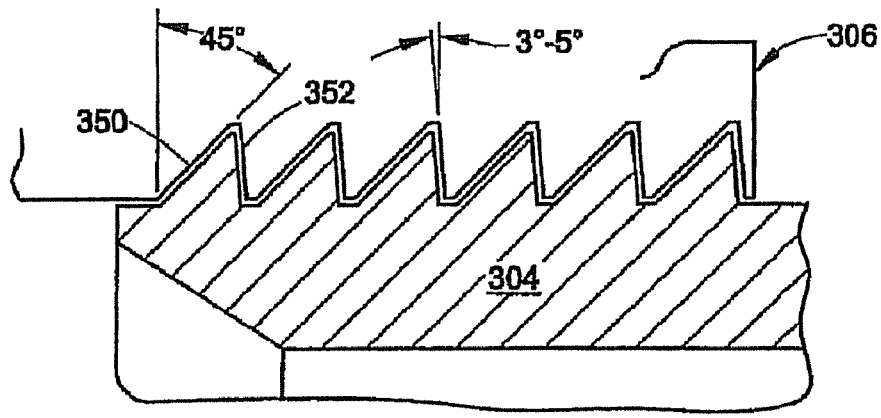
Figure 15C:
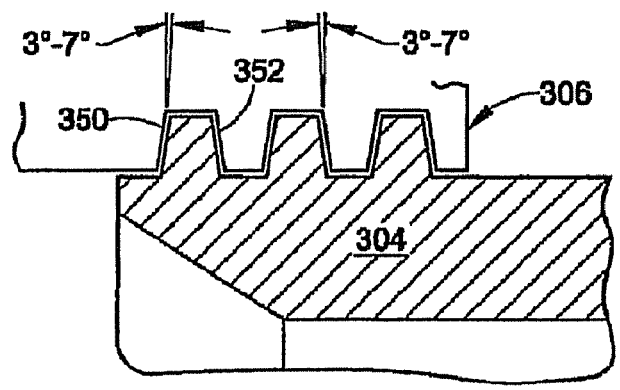

FIGS. 15A, B and C illustrate different thread options for the threaded coupling between the nut 306 and body 304. FIG. 15A illustrates conventional 30° from normal (i.e. 60 degrees included angle) symmetrical thread flanks 350 and 352. FIG. 15B illustrates the optional use of a buttress thread design in which the thread flanks are asymmetrical with one flank 350 typically in the range of about 45 degrees and the adjacent flank in the range of about 3 degrees to about 7 degrees from normal. The buttress thread design provides high strength loading on one side to help reduce flaring of the nut during high torque assembly and in high pressure applications. FIG. 15C illustrates the use of acme threads wherein the flanks again are symmetrical but of a steeper angle such as about 3 degrees to about 7 degrees from normal. The acme thread design provides higher strength loading uniformly compared to the conventional 60 degrees threads.

The invention has been described with reference to the preferred embodiment. Clearly, modifications and alterations will occur to others upon a reading and understanding of this specification. It is intended to include all such modifications and alterations insofar as they come within the scope of the appended claims or the equivalents thereof.

I claim:

1. A tube fitting for metal tubing connections, comprising:
a first fitting component and only a single ferrule, said fitting component having an interior bore that is adapted to receive a metal tube end along a longitudinal axis of the fitting; said bore having a camming surface at a first end of said bore;
said single ferrule having a front end that engages said camming surface to form a seal when the fitting is pulled-up by tightening a second fitting component with said first fitting component and a central bore formed by a cylindrical interior wall sized to be closely received over the metal tube end during assembly; said single ferrule front end having a front edge that will bite into the metal tube end when the tube fitting is assembled with and pulled up on the metal tube end;
said ferrule cylindrical interior wall deforms to form a convex portion in a longitudinal section upon pull-up;
wherein said camming surface forms an included angle of at least thirty-five degrees to about sixty degrees with respect to said longitudinal axis.

2. The tube fitting of claim 1, wherein said camming angle is about forty degrees to about fifty degrees.

3. The tube fitting of claim 1, wherein said ferrule front end has a hardness of at least 660 Vickers.

4. The tube fitting of claim 3, wherein the first fitting component and the metal tube end comprise stainless steel and said single ferrule comprises stainless steel that is case hardened over substantially its entire surface.

5. The tube fitting of claim 1, wherein said single ferrule plastically deforms with a hinging action that produces a radial compression in a central portion of said ferrule against said tube end to swage said ferrule onto the tube end.

6. The tube fitting of claim 1 wherein the bore of the single ferrule comprises a circumferential recess between a front edge of the single ferrule and a back end of the single ferrule so that the bore comprises two cylindrical portions with one of said cylindrical portions continuous to said front edge of the single ferrule.

* * * * *

UNITED STATES PATENT AND TRADEMARK OFFICE
CERTIFICATE OF CORRECTION

| | | |
|---|---|---|
| PATENT NO. | : 7,815,226 B2 | |
| APPLICATION NO. | : 12/197338 | |
| DATED | : October 19, 2010 | |
| INVENTOR(S) | : Peter C. Williams | |

It is certified that error appears in the above-identified patent and that said Letters Patent is hereby corrected as shown below:

Col. 2, lines 42-43, "canning" should read --camming--.

Signed and Sealed this
First Day of March, 2011

David J. Kappos
*Director of the United States Patent and Trademark Office*